Oct. 3, 1933.　　　　C. A. BICKEL　　　　1,929,270
MACHINE TOOL
Filed March 18, 1932　　　　26 Sheets-Sheet 2

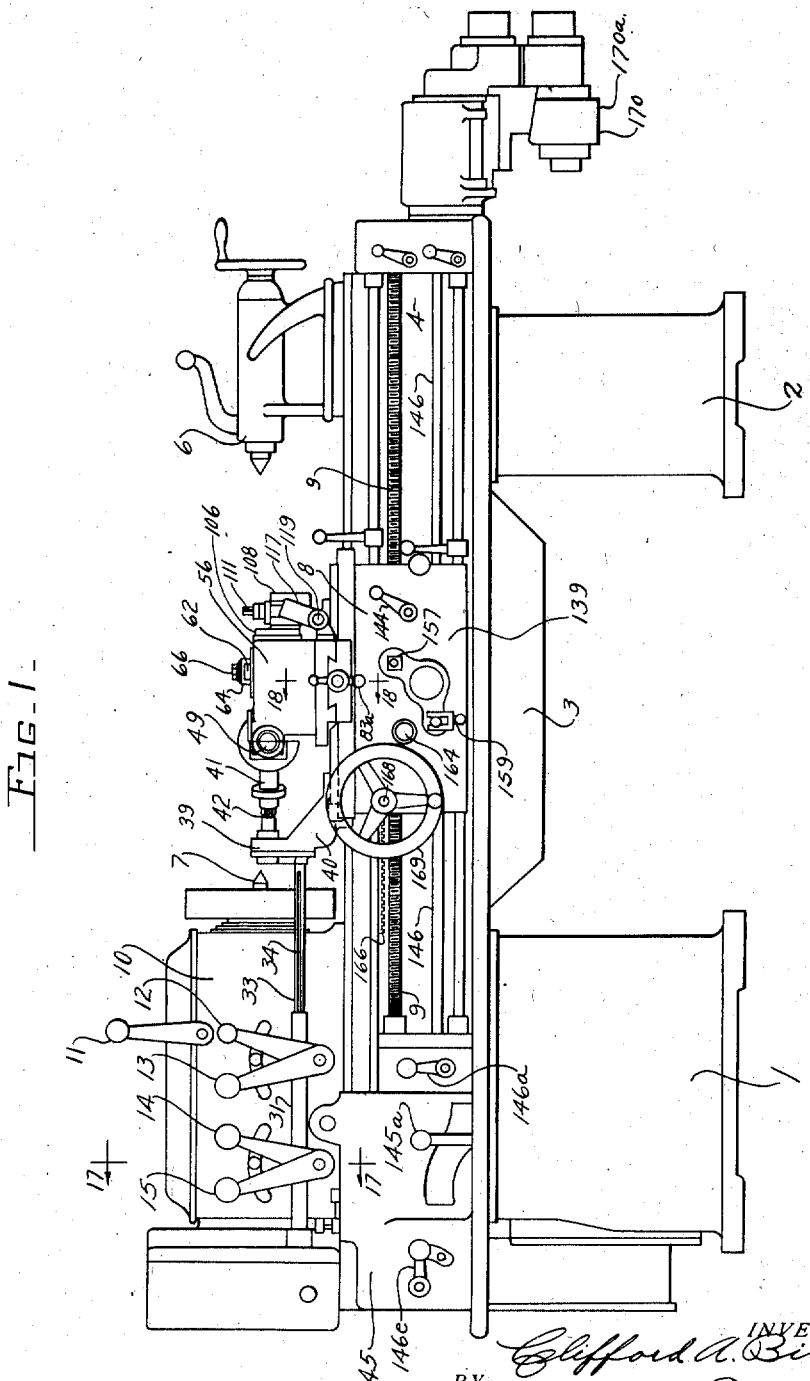

INVENTOR
Clifford A. Bickel.
BY
ATTORNEYS

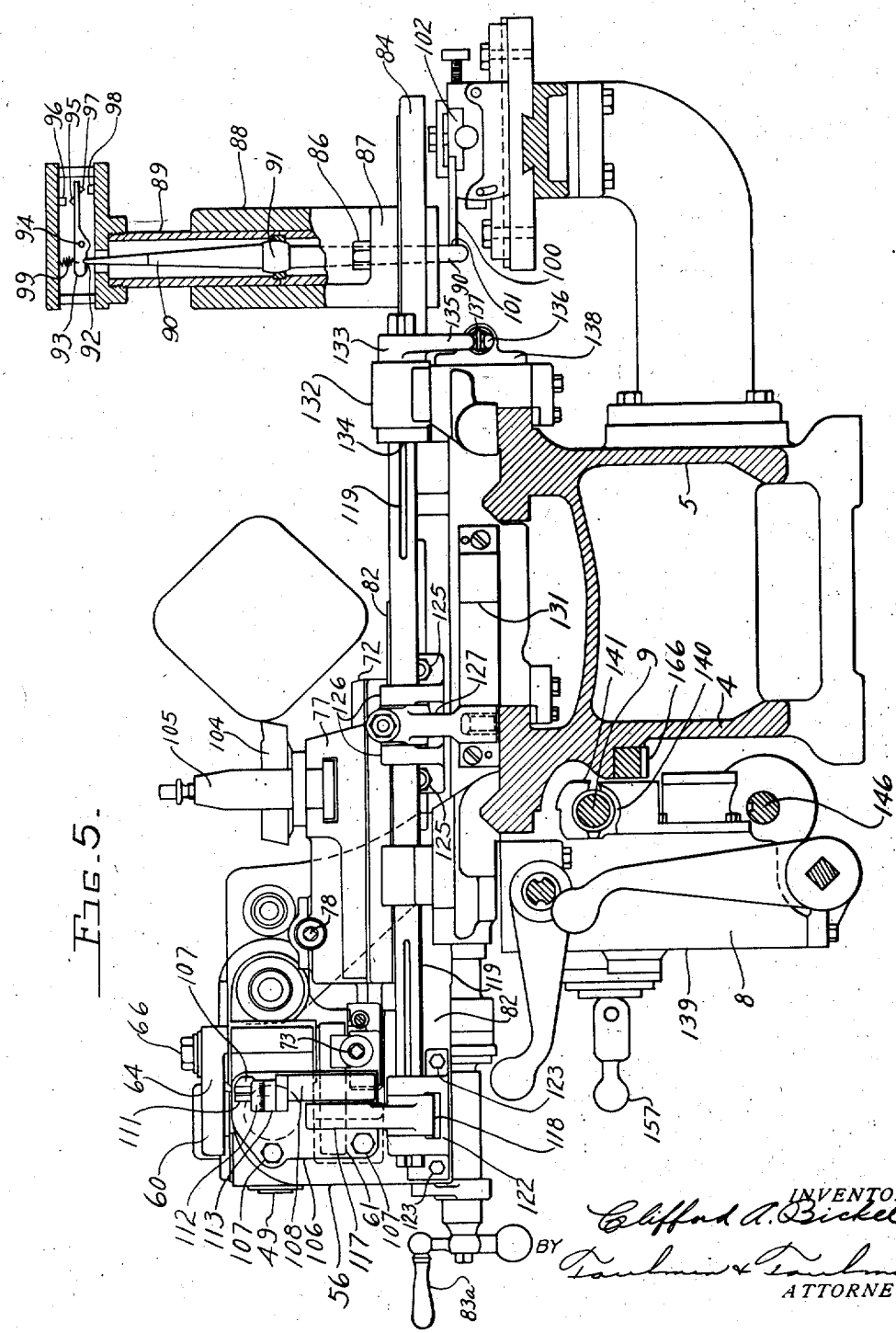

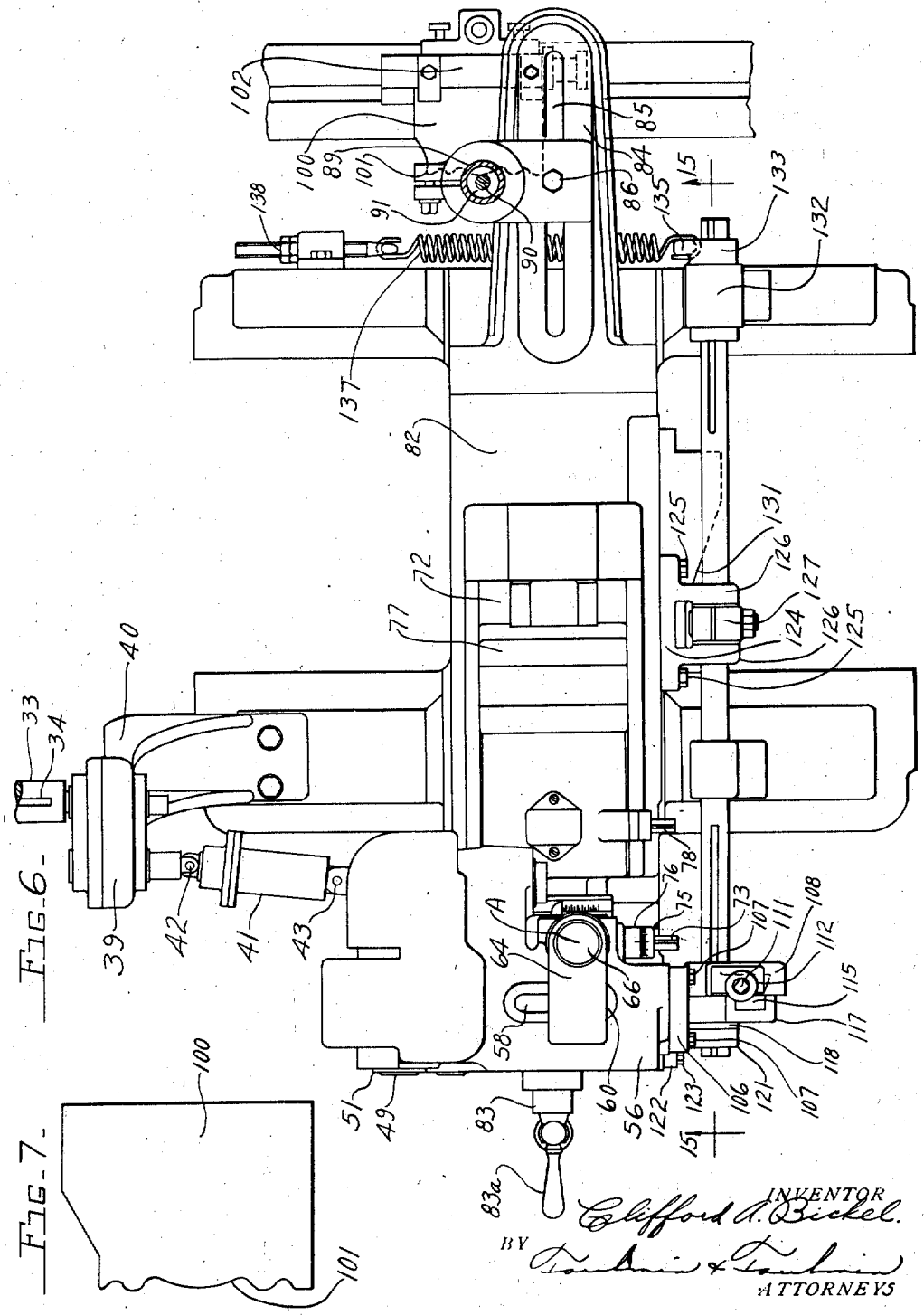

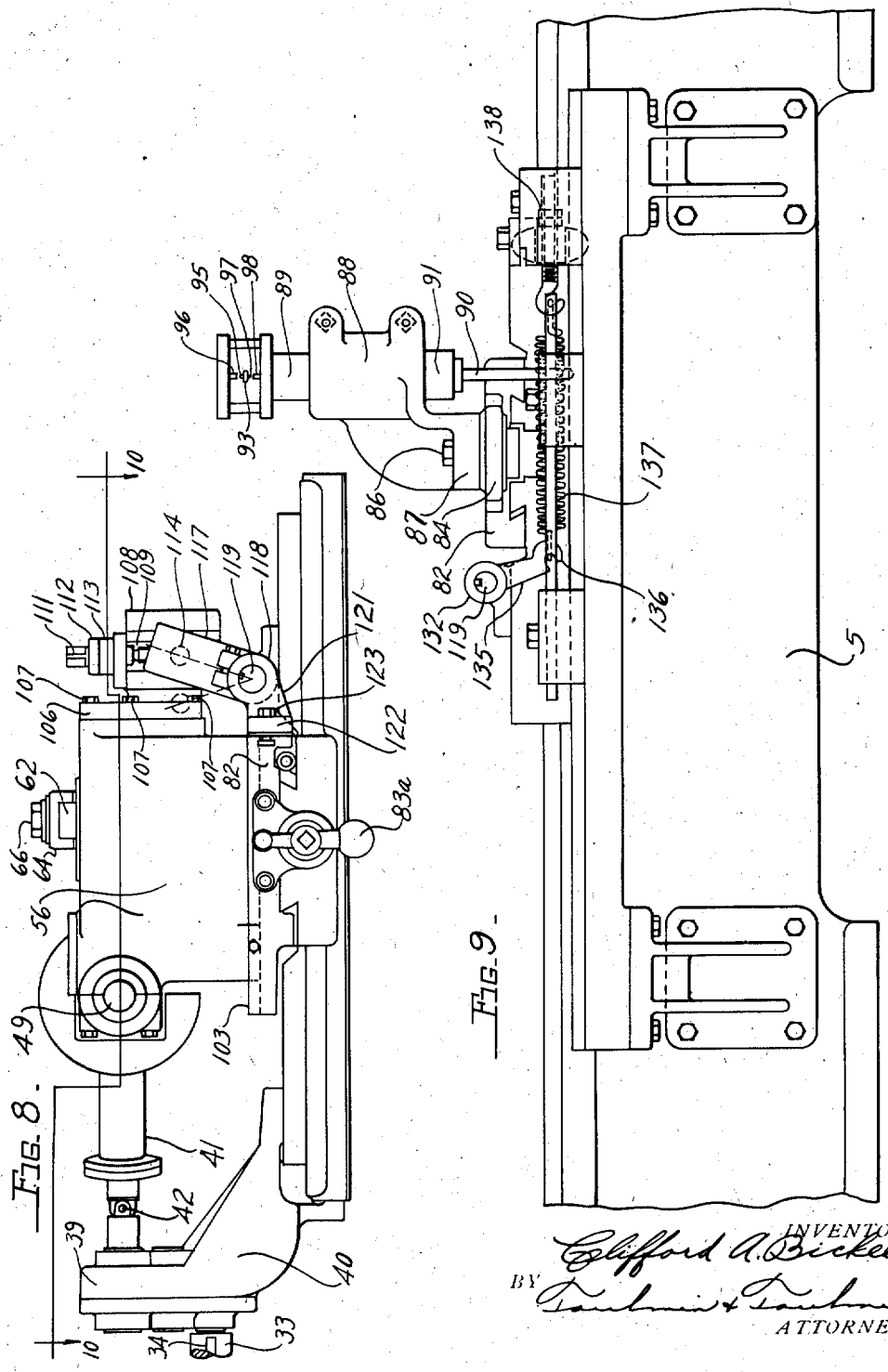

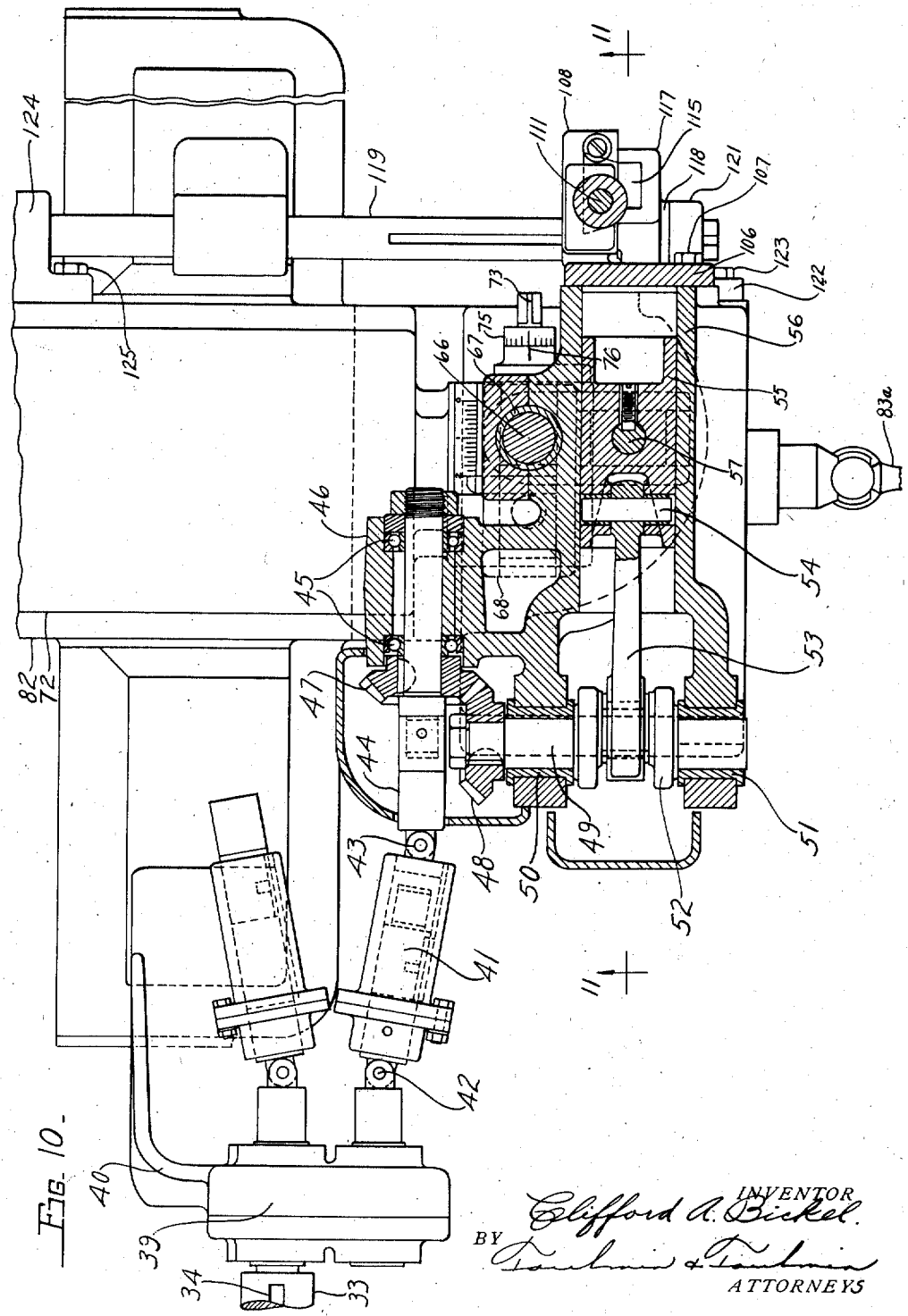

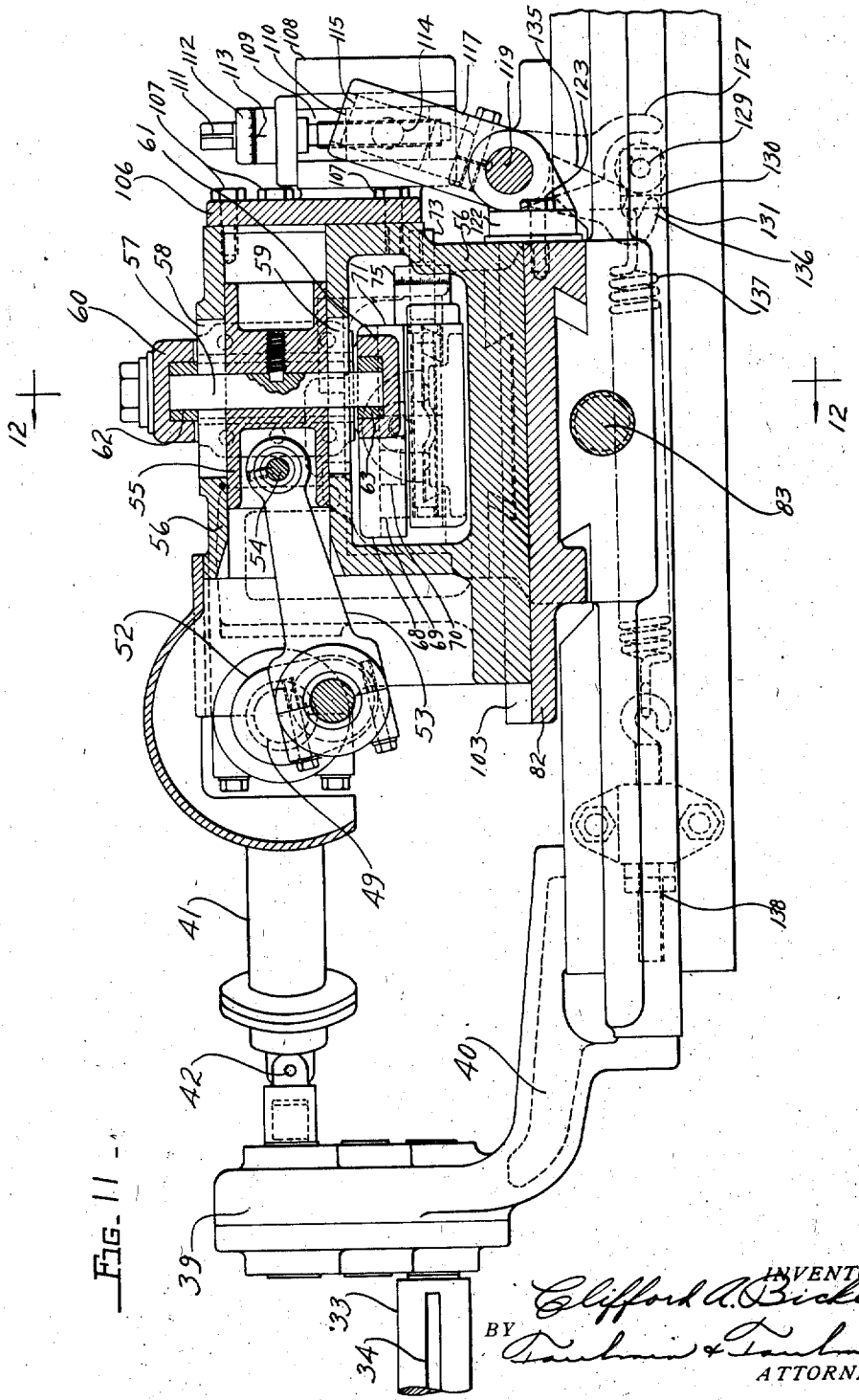

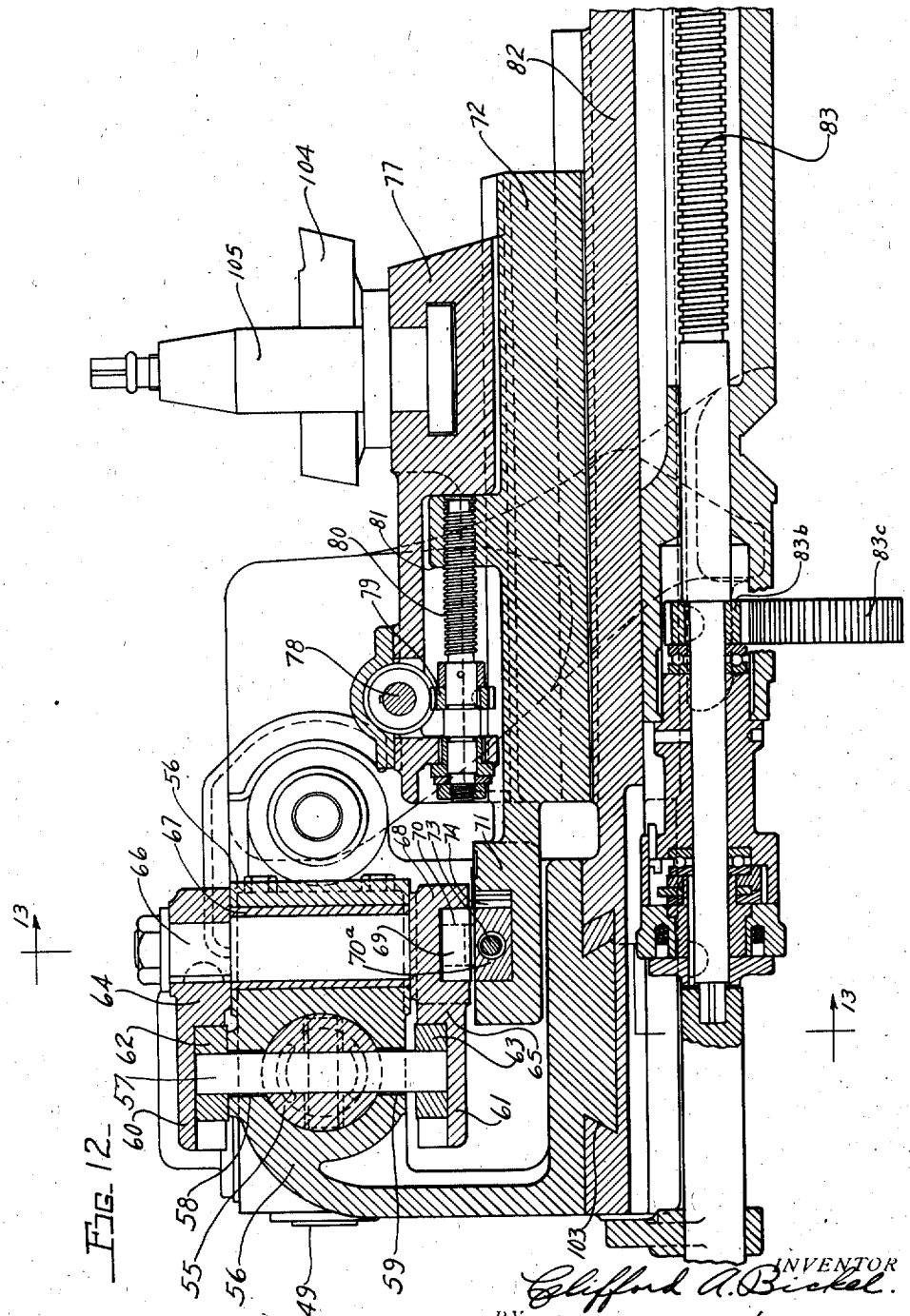

Oct. 3, 1933.  C. A. BICKEL  1,929,270
MACHINE TOOL
Filed March 18, 1932   26 Sheets-Sheet 9
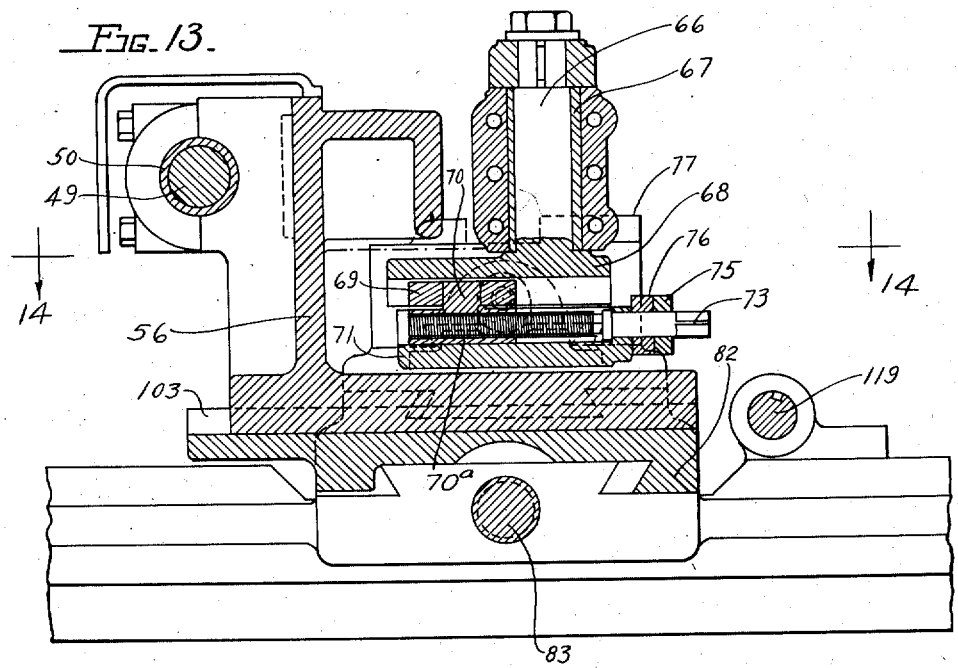
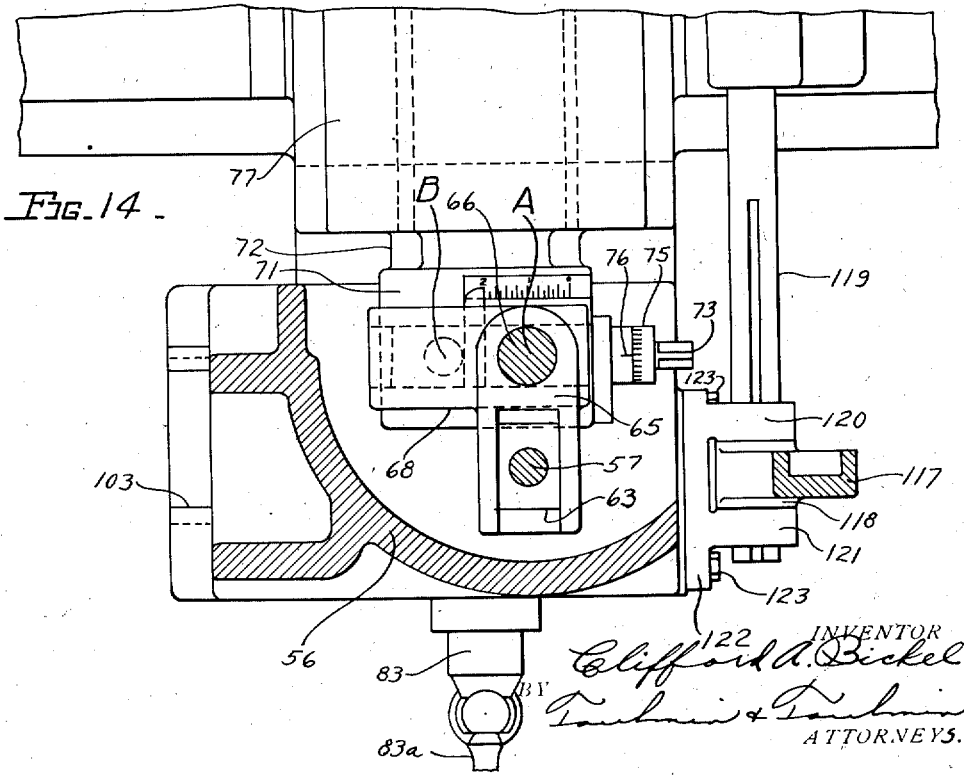

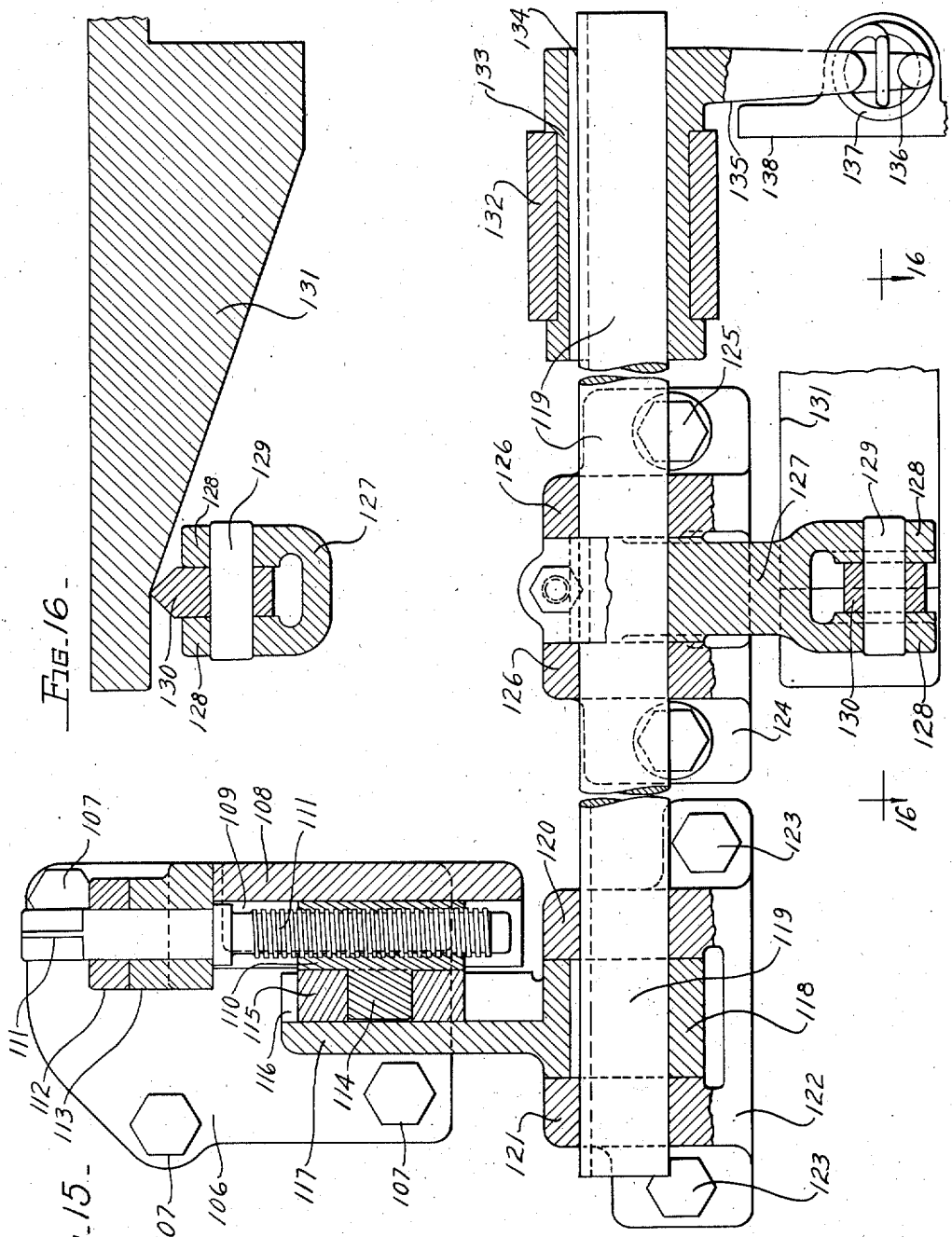

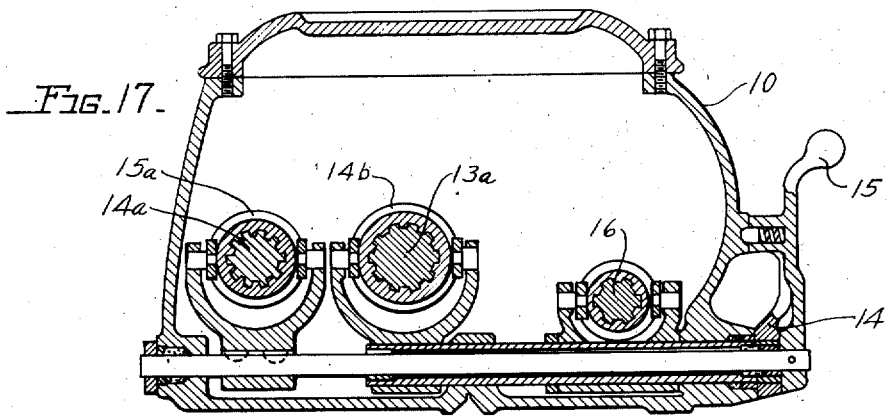
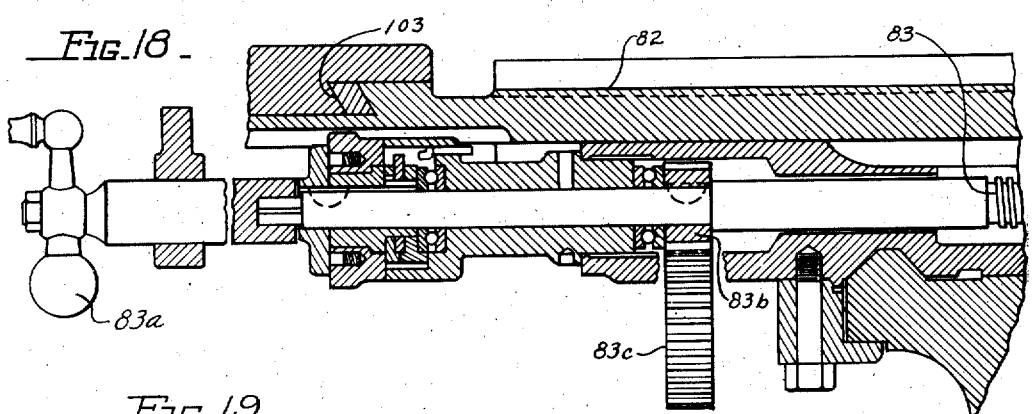
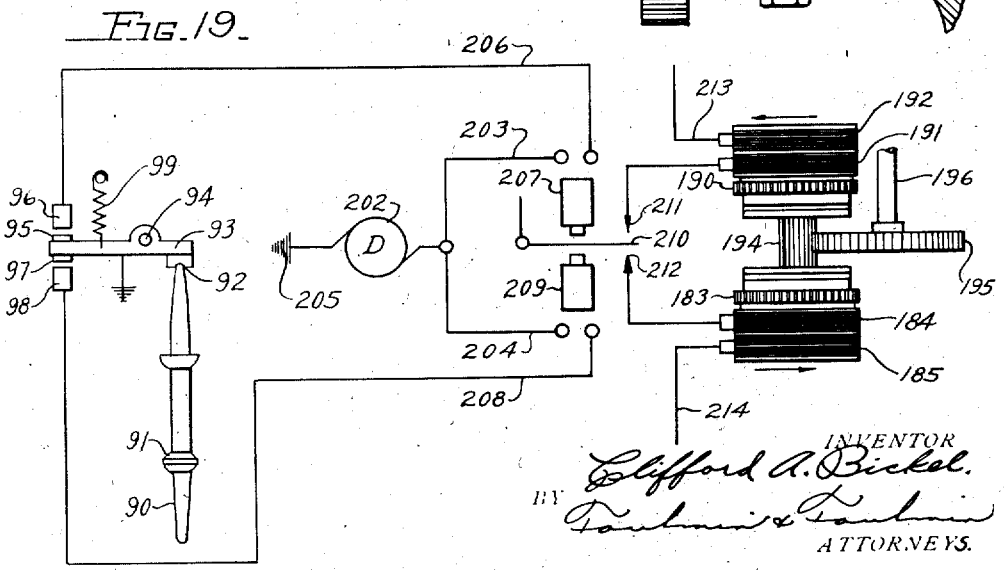

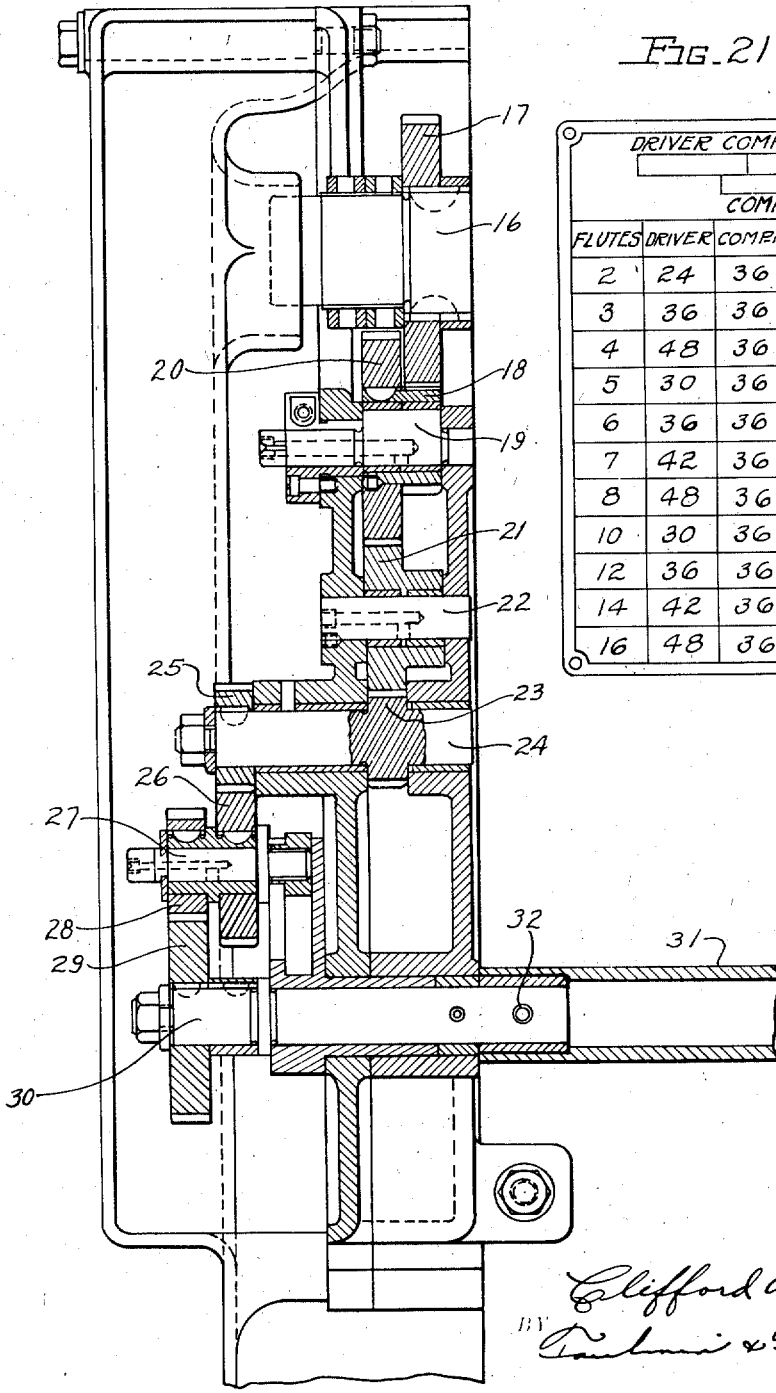

Oct. 3, 1933.  C. A. BICKEL  1,929,270
MACHINE TOOL
Filed March 18, 1932  26 Sheets-Sheet 13

Oct. 3, 1933.                C. A. BICKEL                1,929,270
                             MACHINE TOOL
                        Filed March 18, 1932          26 Sheets-Sheet 14
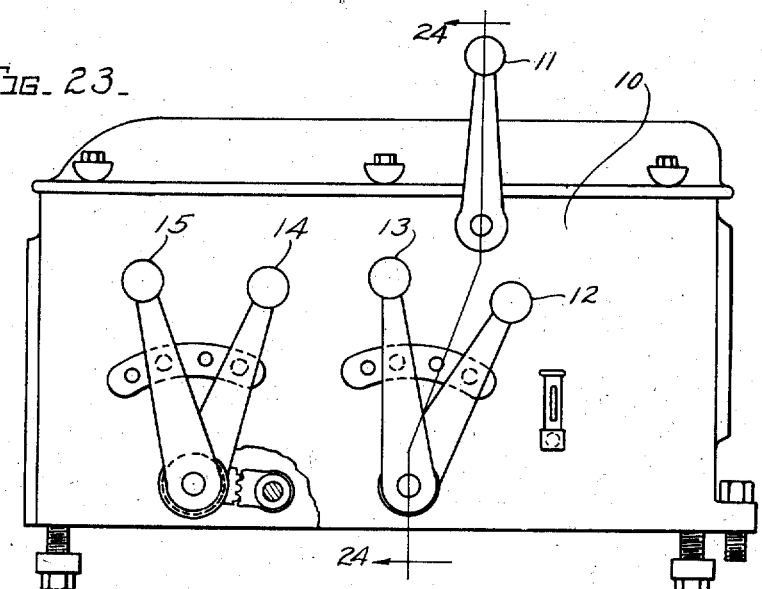
_Fig. 23_
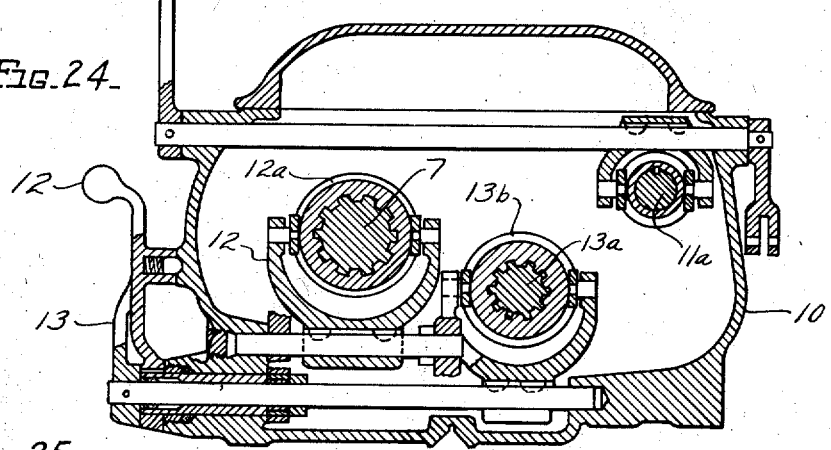
_Fig. 24_
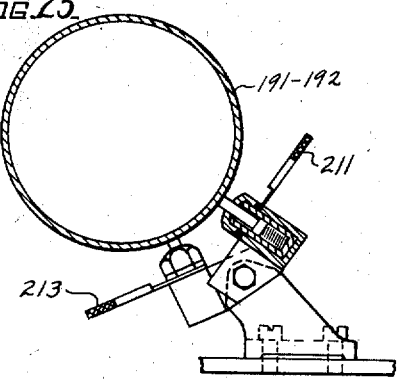
_Fig. 25_
INVENTOR
Clifford A. Bickel.
BY
Faulkner & Faulkner
ATTORNEYS.

Oct. 3, 1933.  C. A. BICKEL  1,929,270
MACHINE TOOL
Filed March 18, 1932    26 Sheets-Sheet 15

INVENTOR
Clifford A. Bickel.
BY
Toulmin & Toulmin
ATTORNEYS

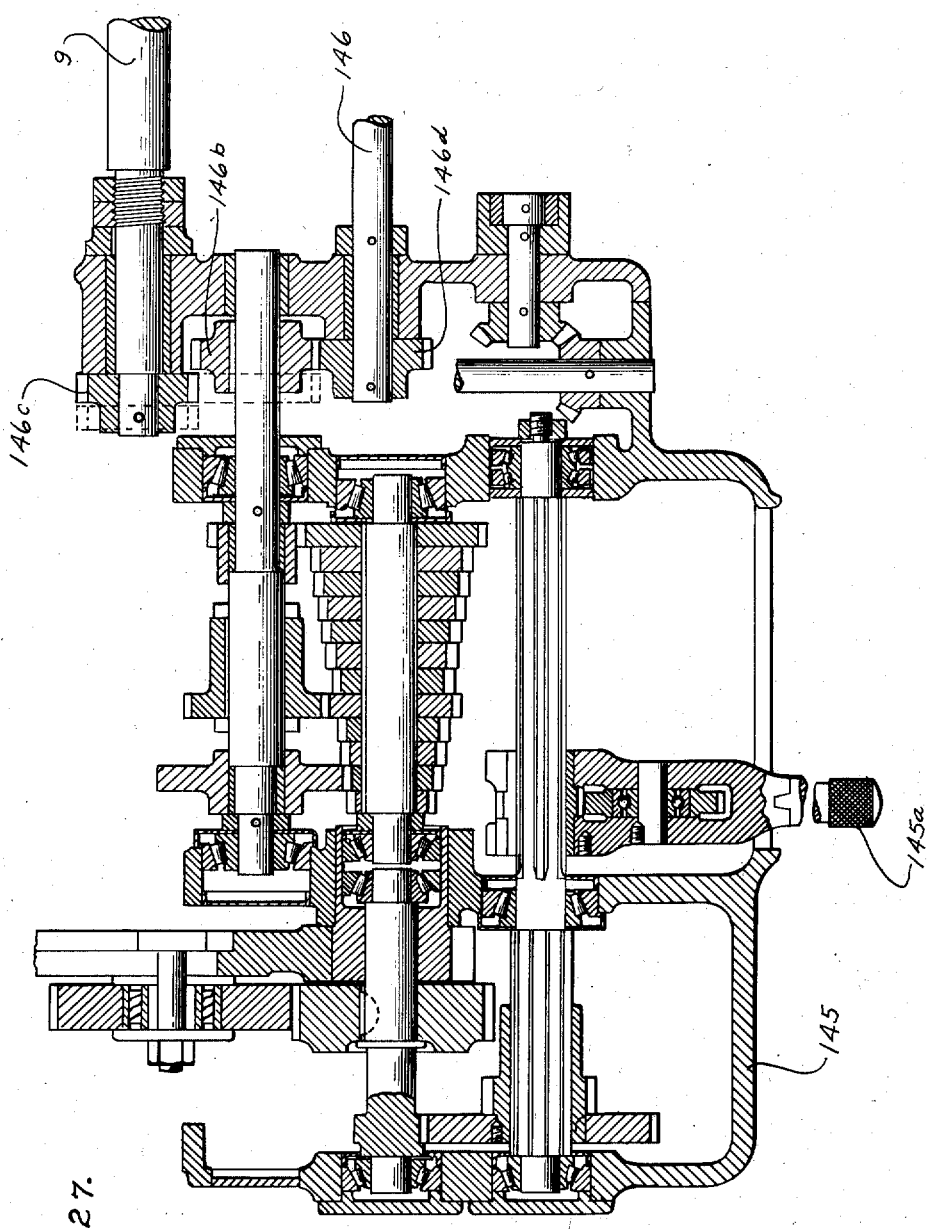

Oct. 3, 1933.  C. A. BICKEL  1,929,270
MACHINE TOOL
Filed March 18, 1932   26 Sheets-Sheet 17
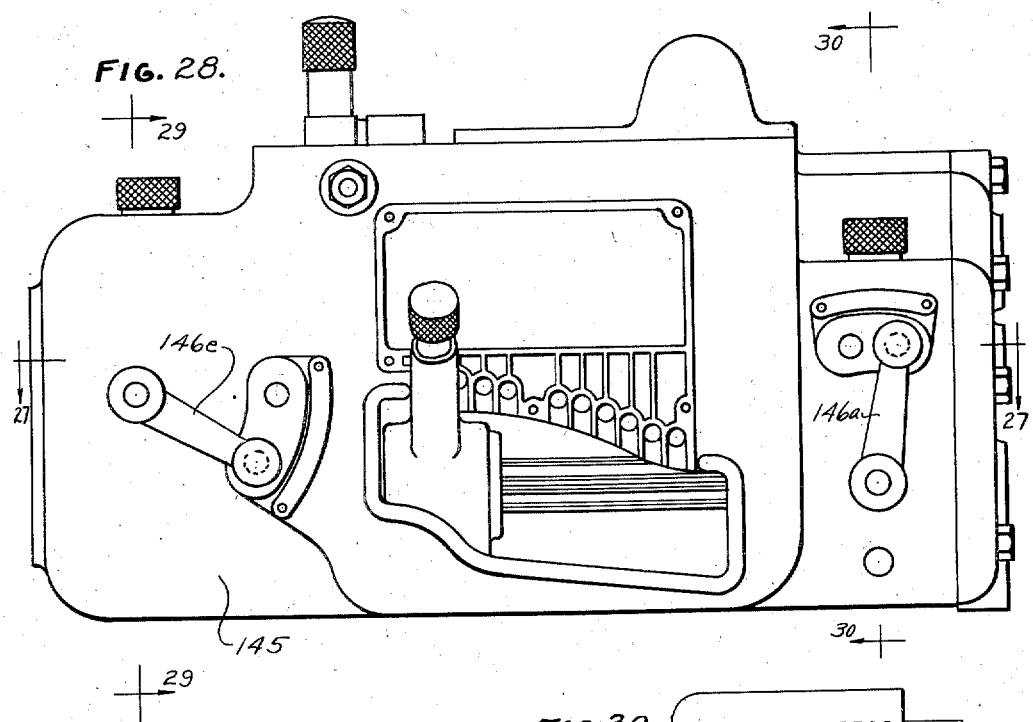
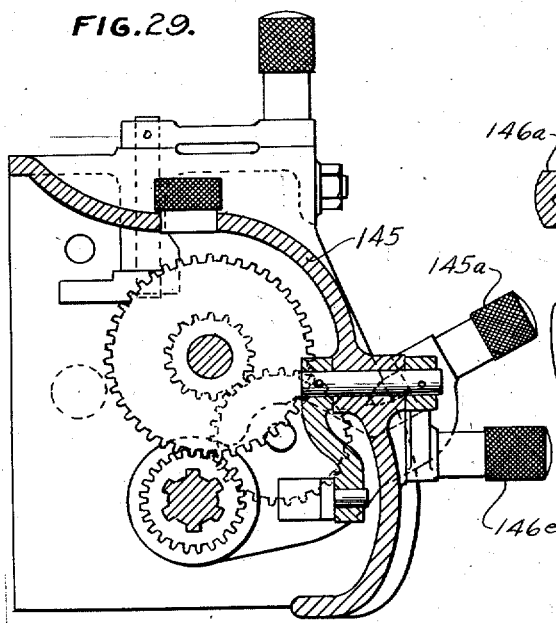
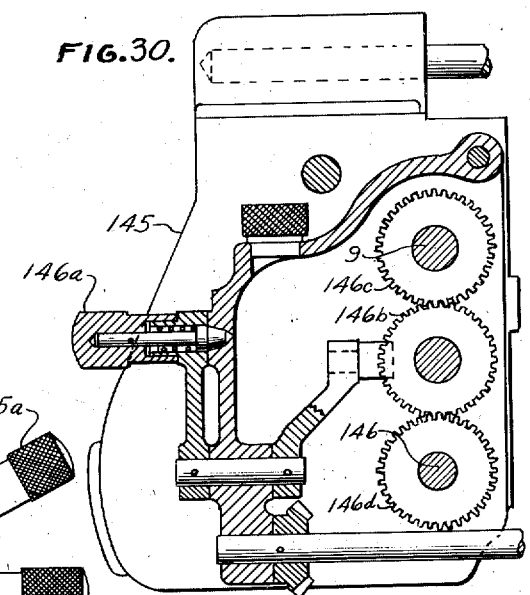
INVENTOR
Clifford A. Bickel.
BY
ATTORNEYS

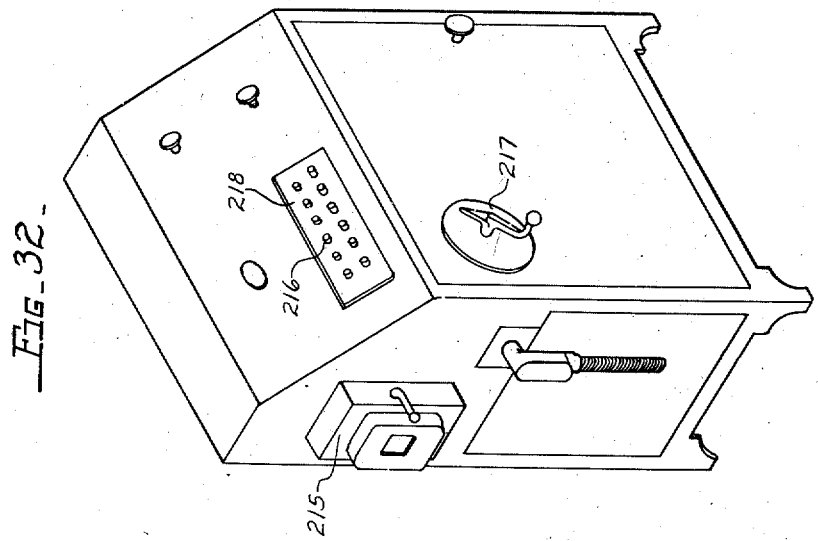
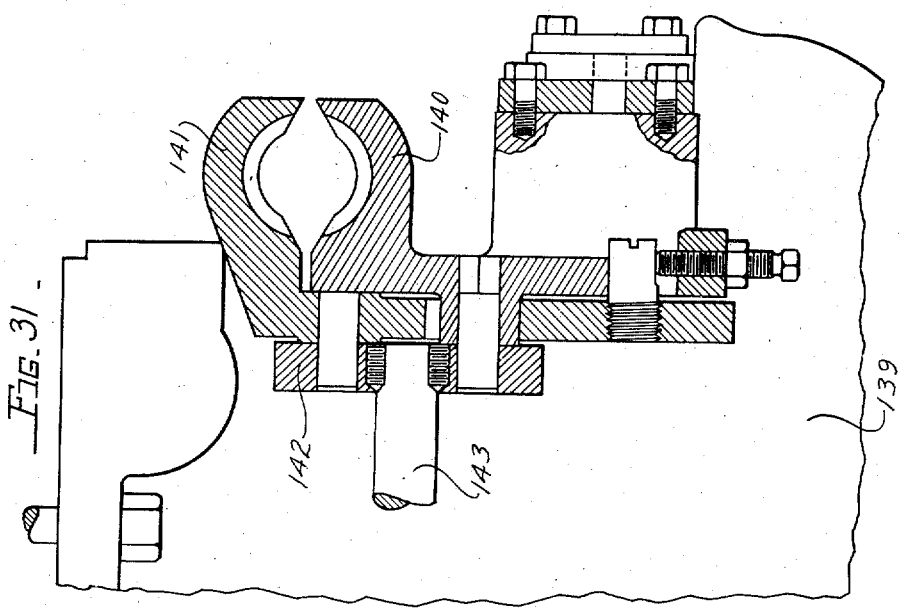

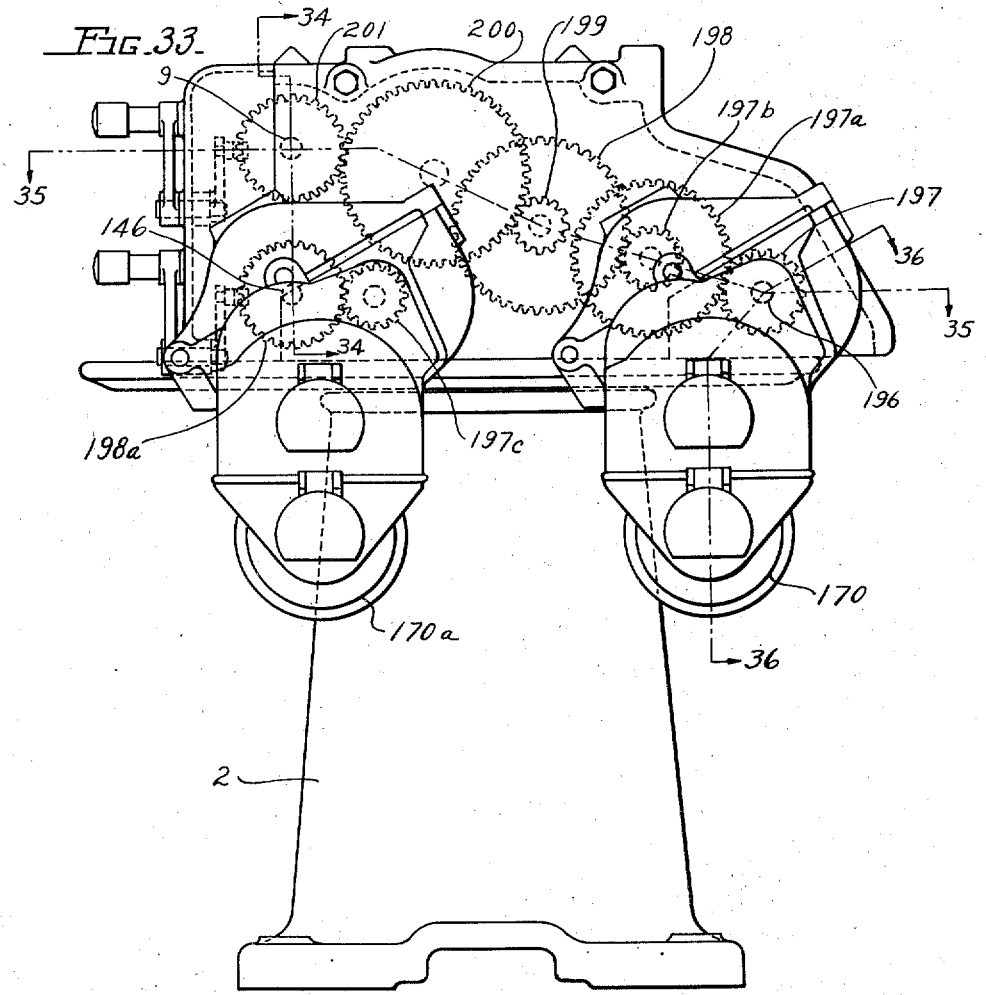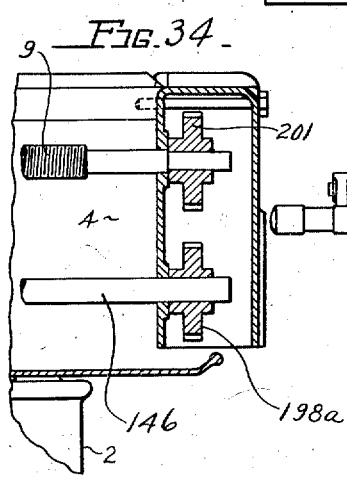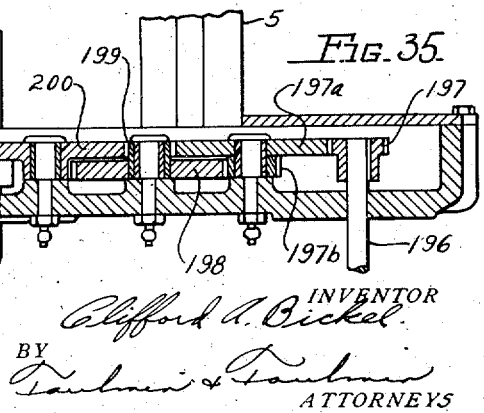

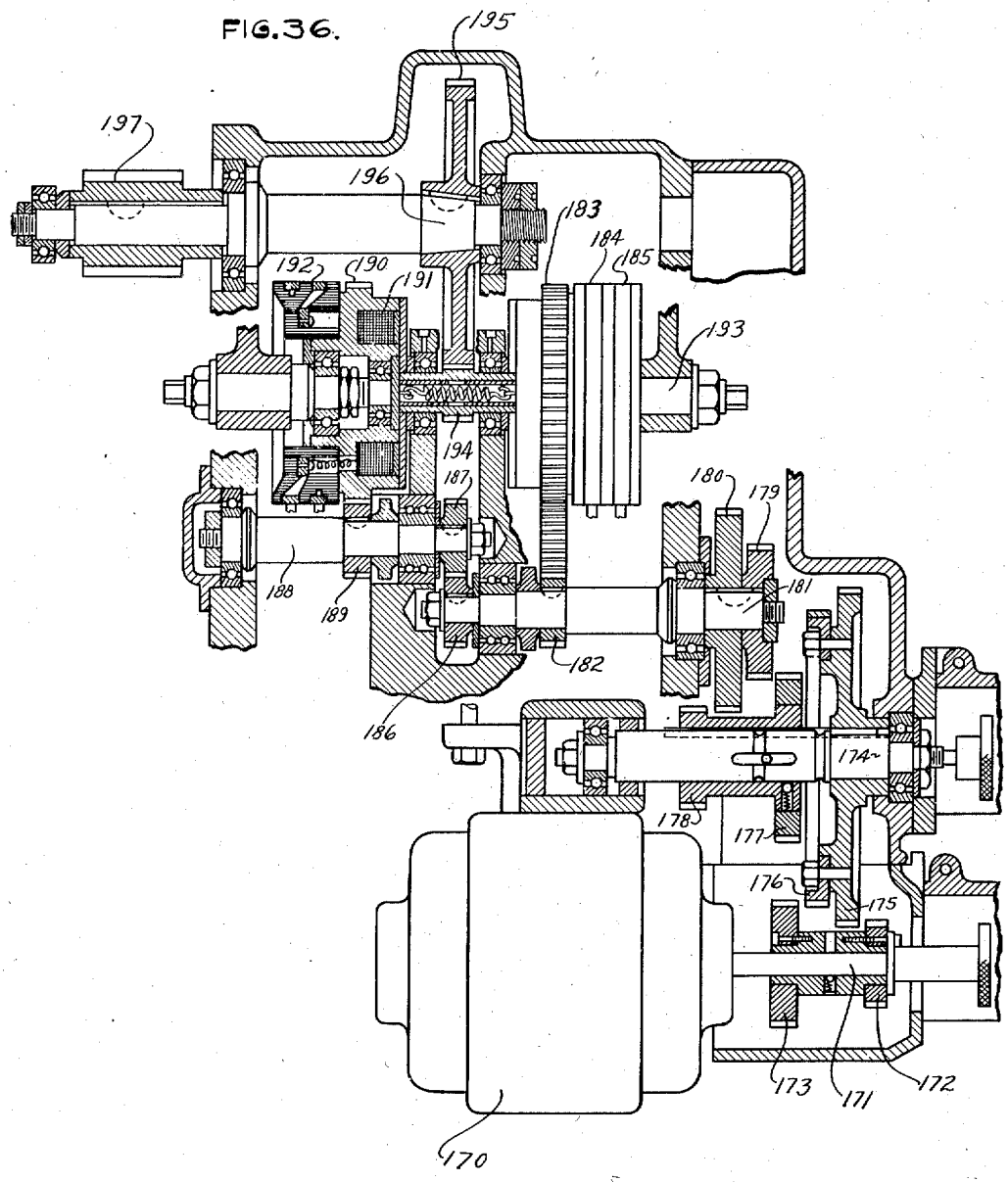

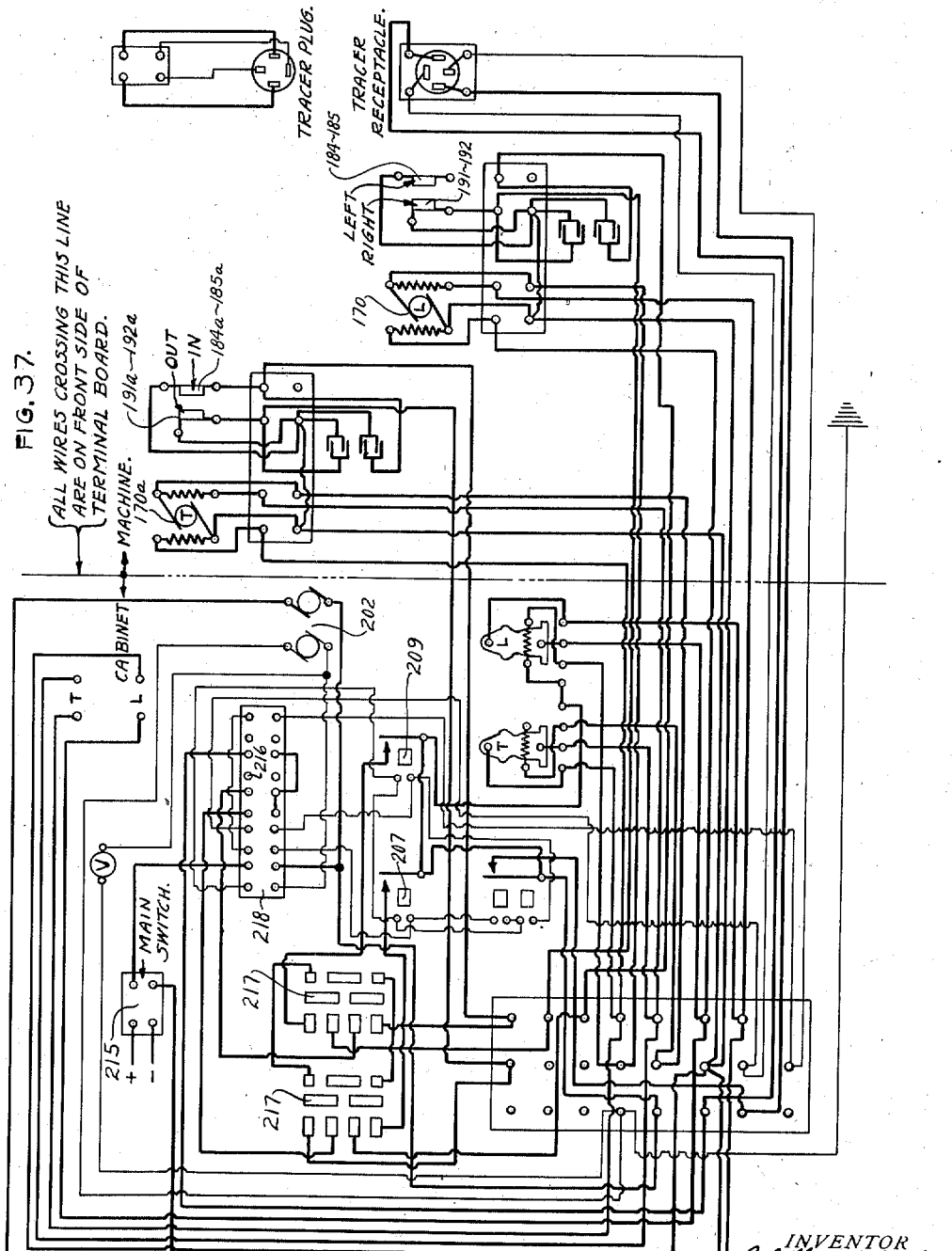

Oct. 3, 1933.  C. A. BICKEL  1,929,270
MACHINE TOOL
Filed March 18, 1932  26 Sheets-Sheet 22

INVENTOR
Clifford A. Bickel
BY
ATTORNEYS

Oct. 3, 1933.     C. A. BICKEL     1,929,270
MACHINE TOOL
Filed March 18, 1932     26 Sheets-Sheet 23
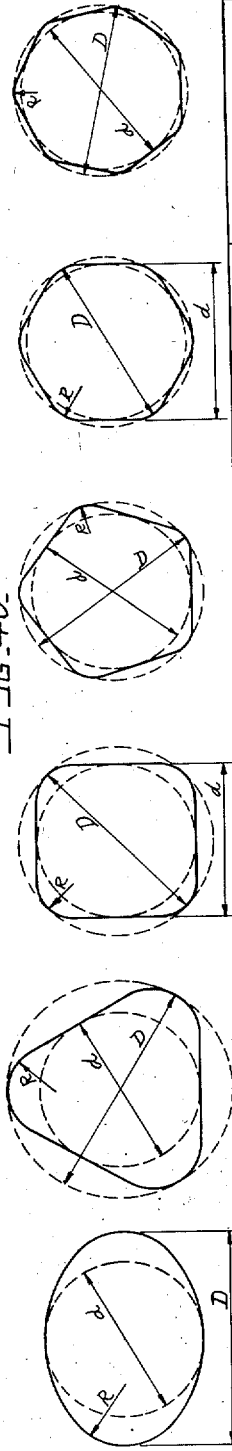
Fig. 40.
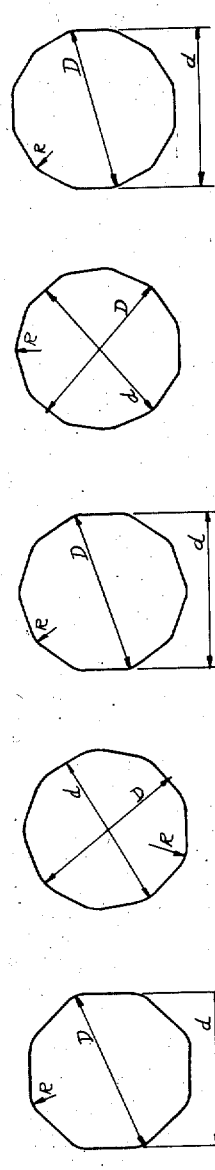
INVENTOR
Clifford A. Bickel.
BY
Toulmin & Toulmin
ATTORNEYS

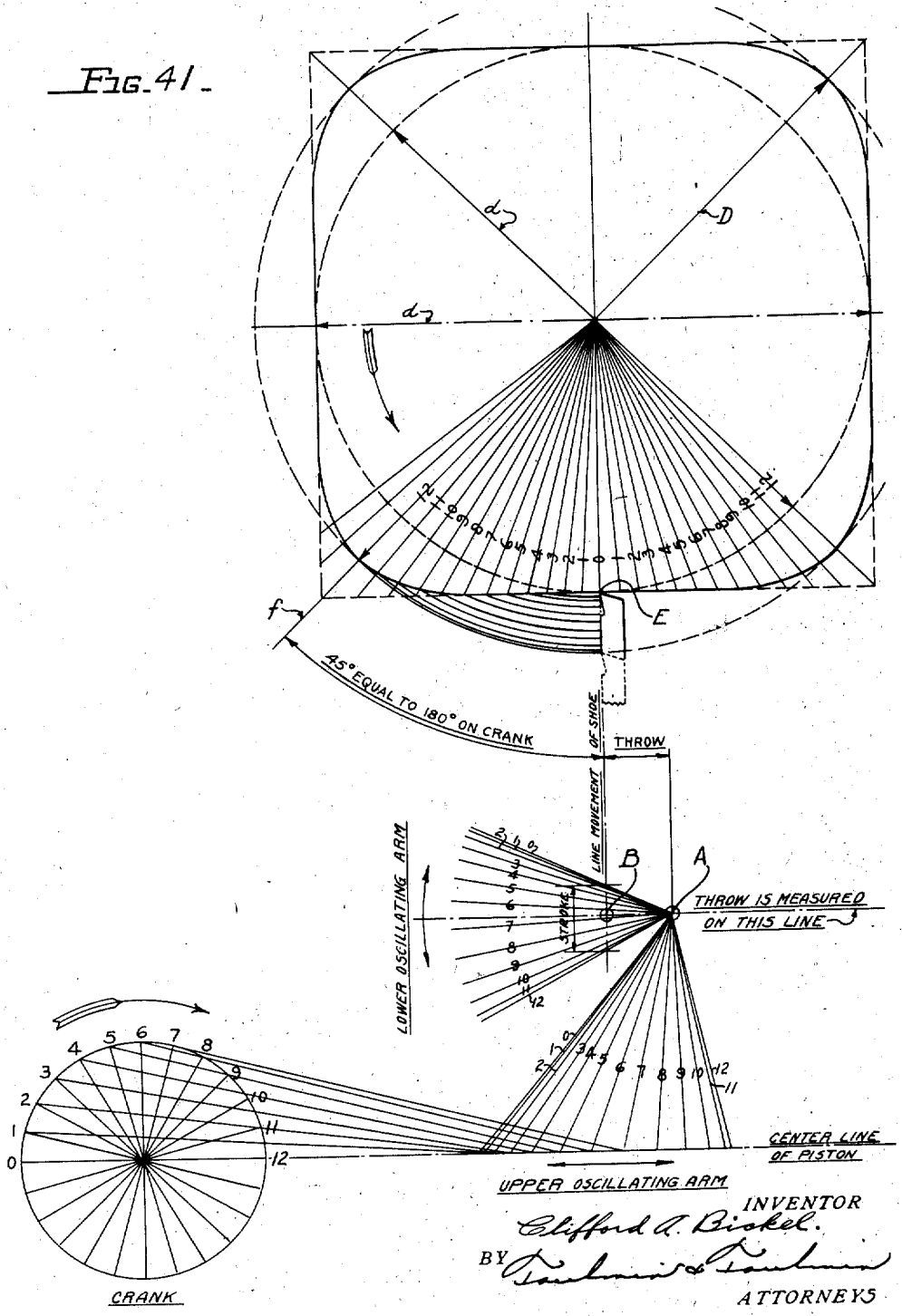

Oct. 3, 1933.  C. A. BICKEL  1,929,270
MACHINE TOOL
Filed March 18, 1932  26 Sheets-Sheet 25
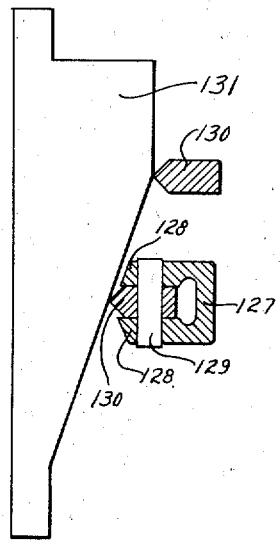
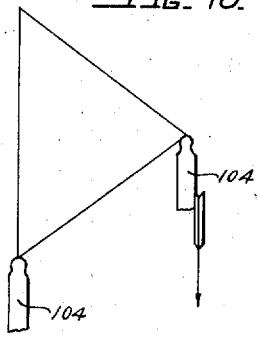
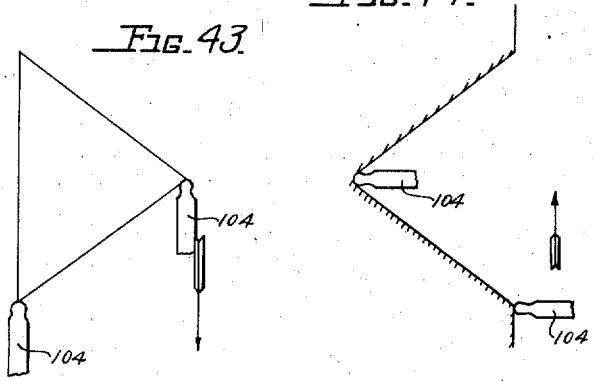
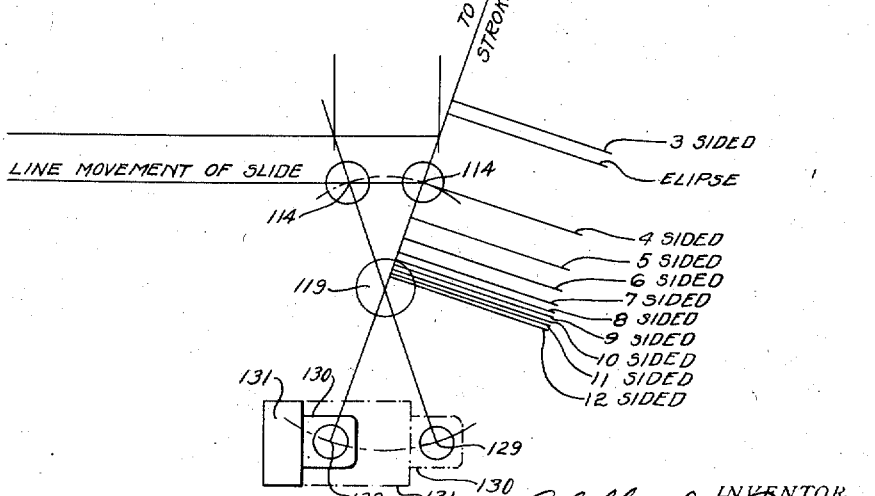

Oct. 3, 1933.  C. A. BICKEL  1,929,270
MACHINE TOOL
Filed March 18, 1932  26 Sheets-Sheet 26
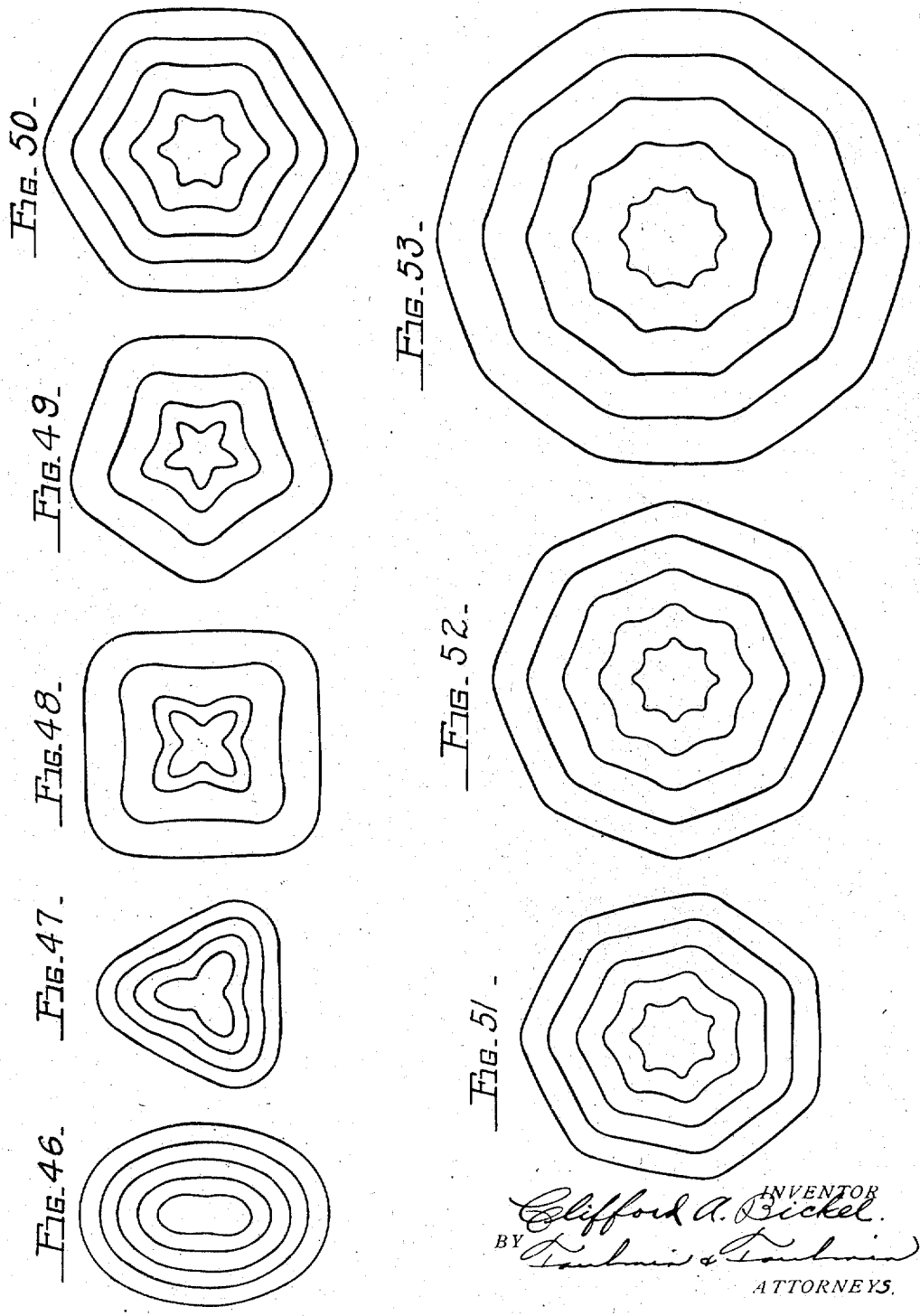

Patented Oct. 3, 1933

1,929,270

UNITED STATES PATENT OFFICE 1,929,270

MACHINE TOOL

Clifford A. Bickel, Sidney, Ohio, assignor to The Monarch Machine Tool Company, Sidney, Ohio, a corporation of Ohio Application March 18, 1932. Serial No. 599,751

45 Claims. (Cl. 82—19)

It is the object of my invention to provide a machine tool which will produce work pieces of regular or irregular shape, with sides that are flat, concave or convex, of irregular diameter or regular diameter with any number of sides and in any predetermined form.

It is my object to provide a machine tool which will cut a work piece automatically according to a predetermined form and, at the same time, impart to the work piece any number of sides of any shape.

It is a further object to provide a machine tool which has the following characteristics:

(1) Means of automatically reciprocating the cutting tool in order to adjust the depth and speed of cut of the tool which in turn controls whether the face of the tool so cut shall be flat, concave, or convex, or of any predetermined configuration.

(2) A machine tool in which the ratio of rotation of the work piece and the tool movement will determine the number of sides cut on the work piece.

(3) A machine tool in which the depth of cut by the cutting tool can be adjusted according to the form of face to be cut.

(4) A machine tool in which the carriage and tool is moved bodily transversely of the work according to the form to be cut to follow a predetermined configuration desired to be imparted to the work.

(5) A machine tool in which the carriage and tool are moved longitudinally of the work in order to cut the work longitudinally.

It is my object to provide a machine tool in which the number of sides formed on a work piece depends upon the ratio of the revolution of the work to tool movement in and out transversely of the work piece; and the depth of cut is so regulated as to determine whether the sides so being cut are flat, concave or convex.

It is my object to provide means of furnishing a control to apply a tool to turn, bore or face a work piece in the manner described herein.

Referring to the drawings:

Figure 1 is a front elevation;

Figure 5 is a section on the line 5—5 of Figure 2;

Figure 6 is a detail plan view of the carriage and associated mechanism;

Figure 7 is a top plan view of a template;

Figure 8 is a detail front elevation of the carriage;

Figure 9 is a rear elevation of the tool;

Figure 10 is a section on the line 10—10 of Figure 8;

Figure 11 is a section on the line 11—11 of Figure 10;

Figure 12 is a section on the line 12—12 of Figure 11;

Figure 13 is a section on the line 13—13 of Figure 12;

Figure 14 is a section on the line 14—14 of Figure 13;

Figure 15 is a section on the line 15—15 of Figure 6;

Figure 16 is a section on the line 16—16 of Figure 15;

Figure 17 is a section on the line 17—17 of Figure 1;

Figure 18 is a section on the line 18—18 of Figure 1;

Figure 19 is a diagrammatic view showing the basic arrangement of the follower pin, electrical switch, magnetic clutches of one part of the driving mechanism for moving the carriage in order to cause the tool to follow the work to impart a predetermined configuration to the work longitudinally of the work;

Figure 20 is a section on the line 20—20 of Figure 2;

Figure 21 is a tabulation of the speed changes effected by the mechanism of Figure 20;

Figure 23 is a detail side elevation of the change speed gear box of the head stock;

Figure 24 is a section on the line 24—24 of Figure 23;

Figure 25 is a detail of the brush arrangement on the slip rings of the magnetic clutches;

Figure 27 is a section on the line 27—27 of Figure 28;

Figure 28 is a front elevation of the change speed mechanism on the lead screw;

Figure 29 is a section on the line 29—29 of Figure 28;

Figure 30 is a section on the line 30—30 of Figure 28;

Figure 31 is a detail section through the apron and apron screw nut engaging the lead screw;

Figure 32 is an isometric view of the electrical control cabinet;

Figure 33 is an end elevation of the right hand end of the tool;

Figure 34 is a section on the line 34—34 of Figure 33;

Figure 35 is a section on the line 35—35 of Figure 33;

Figure 36 is a section on the line 36—36 of Figure 33;

Figure 37 is a wiring diagram of the electrical control mechanism controlling the imparting of the proper configuration of the work piece according to the template used;

Figure 4:
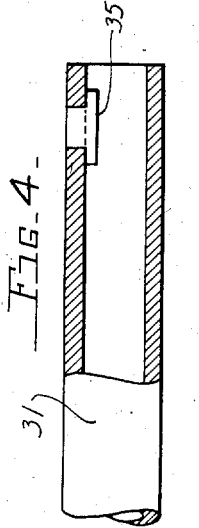
Figure 4 is a partial section through the key sleeve shown in Figure 3.
Figure 2:
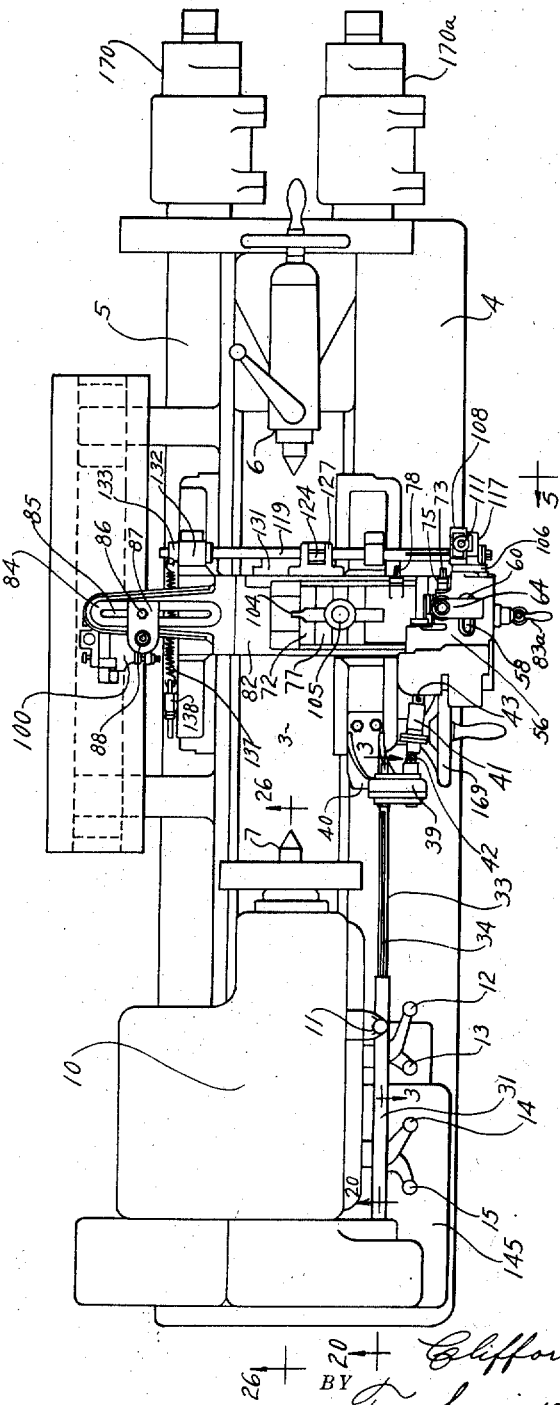
Figure 2 is a top plan view.
Figure 3:
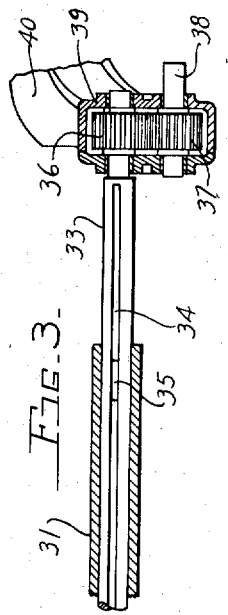
Figure 3 is a section on the line 3—3 of Figure 2.
Figure 22:
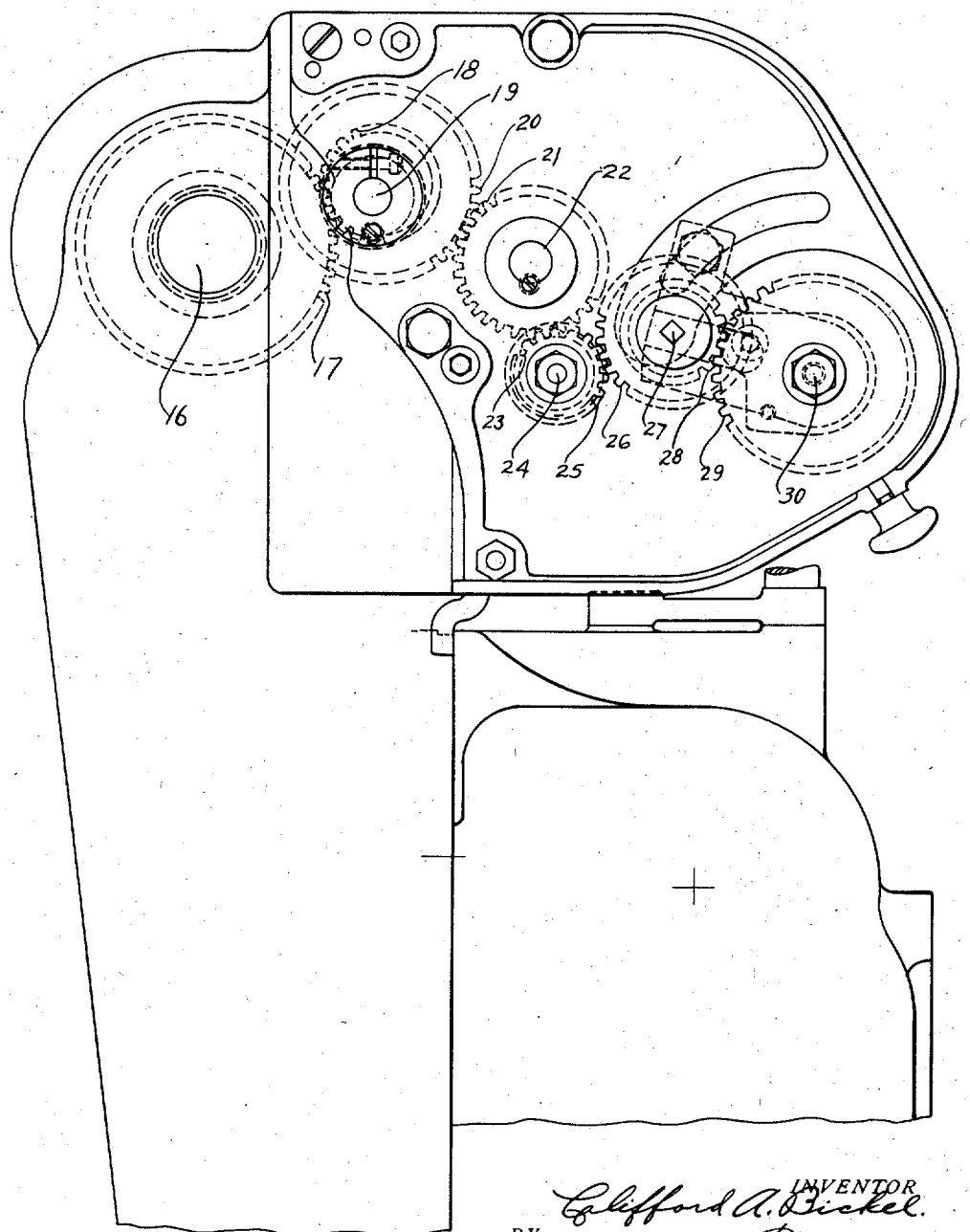
Figure 22 is an elevation of the left hand end of the tool showing the change gear mechanism for changing the speed of rotation of the work piece.

Figure 40 indicates a series of diagrams with the tabulation information for the setting of the machine to form the work piece into a section shown by each diagram;

Figure 41 is a diagrammatic view showing the movements of the several parts including the tool in order to impart a given face surface and a given number of faces to a work piece by the tool;

Figure 42 is a diagrammatic view showing the different positions of a cam follower on the cam which regulates the extent of tool movement according to the alteration in cross section of the work piece to be worked upon;

Figure 43 is a diagram of the movement of the tool in applying it successively to the surface of a work piece that is to be of different diameters as the tool progresses longitudinally of the work piece;

Figure 44 is a similar view showing the movement of the tool in connection with the facing operation;

Figure 45 is a diagrammatic view showing the adjusting of the cam follower with respect to the cam and the controlling of the slide which carries the tool actuating mechanism according to the different diameters of a work piece as the tool moves longitudinally of the work;

Figure 46 is an end elevation of an elliptical tapering work piece;

Figure 47 is an end elevation of a triangular tapering work piece having near its tip concave sides;

Figure 48 is an end elevation of a square work piece having near its tip convex sides;

Figure 49 is an end elevation of a five-sided work piece having near its tapered end convex sides;

Figure 50 is an end elevation of a tapered work piece having six sides;

Figure 51 is an end elevation of a tapered work piece having seven sides;

Figure 52 is an end elevation of a tapered work piece having eight sides;

Figure 53 is an end elevation of a tapered work piece having ten sides.

Referring to the drawings in detail, 1 and 2 indicate the legs of the tool connected together by a pan 3. 4 indicates the front wall of the tool and 5 the rear wall. 6 indicates the tail stock and 7 the head stock spindle and the live center. 8 designates the carriage actuated by the lead screw 9.

Referring to Figures 17, 23 and 24 the head stock casing 10 contains the change gear mechanism for the head stock spindle and the live center 7. Such mechanism of conventional character is controlled by the levers 11, 12, 13, 14 and 15. The exact nature of this mechanism is not important in connection with this invention and is diagrammatically illustrated in this application for the purpose of clarity.

Figure 26:
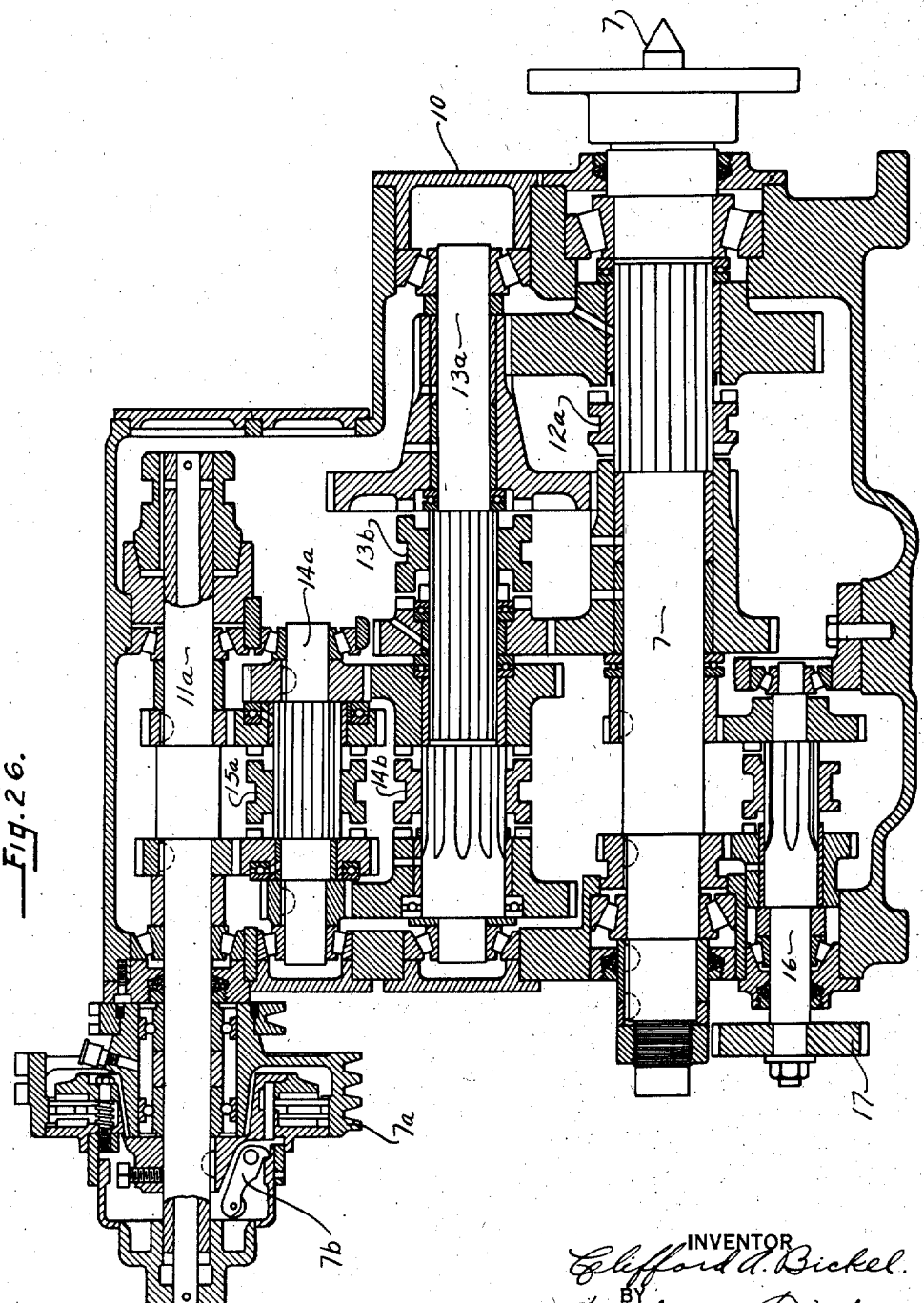
Figure 26 is a section on the line 26—26 of Figure 2.

Referring to Figures 20 and 26, 16 indicates a spindle in the head stock casing on which is mounted a gear 17 engaging with a pinion 18 on the stub shaft 19 which, in turn, carries the gear 20. The gear 20 meshes with pinion 21 on the shaft 22 which in turn engages the gear 23 on the shaft 24. This shaft carries a pinion 25 meshing with the gear 26 on the shaft 27 which in turn supports the gear 28 engaging the gear 29 on the shaft 30 which operates the sleeve 31 to which it is pinned by the pin 32. Within this sleeve is mounted the drive shaft 33, the key way 34 in such shaft being engaged by the pin 35. Mounted on the shaft 33 is a gear 36 meshing with a gear 37 on a shaft 38. These gears are carried in the gear box 39 on the bracket 40 attached to the carriage 8. The shaft 38 is connected by the connecting sleeve 41 through the pivot joint 42 by the pivot joint 43 to the shaft 44. (See Figure 10).

*Carriage and tool actuating mechanism*

The shaft 44 is journaled on spaced bearings 45 within the sleeve 46 and carries a miter gear 47 which engages with a companion miter gear 48 on the shaft 49 supported upon the bearings 50 and 51 which are spaced from one another on either side of the crank 52 formed in the shaft 49. This crank carries a pitman 53, the free end of which is pivoted at 54 in the piston slide 55 carried within the cylinder 56. The cylinder 56 is integral with the bearing supports for the crank shaft 49 and the sleeve 46 which supports the shaft 44. The cylinder 56 and the sleeve 46 form a transverse slide casing mounted on the cross slide. The piston 55 carries a vertically-disposed pin 57 which extends upwardly through the slot 58 and downwardly through the slot 59 so that the free ends of the pin 57 are engaged by the caps 60 and 61 respectively which cover the slide blocks 62 and 63. The caps 60 and 61 are mounted on arms 64 and 65 that are journaled upon the vertical shaft 66 mounted within the sleeve 67 in the housing 56. On the lower end of the shaft 66 is the oscillating arm 68 which, in turn, actuates the shoe 69 slidably mounted in the arm 68 and a pin 70 on a slide block 70a that engages and slides in the arm 71 of the intermediate slide 72. The shoe 69 is held in position and adjusted by a set over screw 73 engaging the slide block 70a and gib 74. A micrometer collar 75 is mounted on the screw 73 and operates in conjunction with the scale 76. Hand adjustment of the tool slide 77 on the intermediate slide 72 is effected, as shown in Figure 12, through the hand screw 78 engaging the spiral gear 79, screw 80 and nut 81 which is a part of the slide 72. The intermediate slide 72 rests on the cross slide 82, which is connected to the cross feed screw 83 in the usual manner.

*Follower pin construction*

The tracer bracket 84 consists of a slotted member having a slot 85 to which is adjusted by the bolt 86 the carrier arm 87 which carries the casing 88 in which is mounted the sleeve 89 that carries the rocking follower pin 90, on the universal joint 91. The upper end of the follower pin at 92 engages the under side of the switch arm 93 which is pivoted at 94 moving that arm upwardly or downwardly so that either the contacts 95 and 96 are made or broken; or the contacts 97 and 98 are made or broken. The spring 99 resists this movement. The electrical features of this control are described hereinafter.

The template which actuates the lower end of the follower pin is designated 100. It has an irregular edge 101 which is the form desired to be duplicated on the work piece. The template is mounted in a supporting bracket 102 and may be adjusted, if desired, to different angular positions. The details of this construction do not form any part of the present invention.

Adjustment mechanism for adjusting tool position according to changes in diameter of the work piece The cross slide 82 carries in a dovetail construction 103 the casing 56 which houses the mechanism for actuating the intermediate slide and tool slide with the tool 104 mounted in the tool holder 105. This adjustment can be made according to the number of sides that are being turned upon the work piece and to conform to the changes in diameter of the work piece.

The details of this mechanism are as follows:

The transversely slidable casing 56 sliding in the dovetail 103 is caused to slide longitudinally of the apparatus by reason of the fact that a bracket 106 is bolted by bolts 107 to the casing 56 and carries upon it a sleeve 108 having a vertically-disposed guideway 109 in which is located a sliding block 110 actuated by a screw 111 having a micrometer head 112 and a scale 113. This block carries a transverse pin 114 on which is mounted a block 115 traveling in the vertically-disposed guideway 116 of the guide member 117, the lower end of which terminates in a sleeve 118 keyed to the shaft 119 and retained between the collars 120 and 121 which act as supports for the shaft 119. These collars are mounted on a bracket 122 attached by the bolts 123 to the cross slide 82. The shaft 119 is supported in a bracket 124 bolted by the bolts 125 to the T-slot in the cross slide 82. This bracket has a pair of spaced supporting ears 126 between which is located the cam follower arm 127 which is mounted upon the shaft 119. This cam follower arm terminates in a pair of jaws 128 carrying a transverse pin 129 and a follower member 130 mounted thereon between the jaws. This follower member engages with the margin of the cam 131 bolted to the carriage. The rear end of the shaft 119 is supported within a bracket sleeve 132 that is bolted to the carriage 8. This sleeve 132 in turn carries a rotating sleeve 133 that is keyed by the key 134 to the shaft 119. The sleeve 133 has a depending arm 135 terminating in the hook 136 to which is connected a helical spring 137, the other end of which is adjustably connected at 138 on the rear portion of the carriage.

The function of the cam 131 is as follows:

The cam 131 is mounted upon the carriage while the cam follower with its associated mechanism is mounted upon the cross slide. Therefore, as the cross slide moves inwardly on the carriage, the adjustment of the mechanism associated with the cam follower will be adjusted according to the difference in diameter of the work piece. Such adjustment is effected through mounting the bracket 122 on the cross slide and pivoting about the center of that bracket the arm 117 which is mounted on the cam follower shaft 119 and is actuated by that shaft so as to adjust the center of the pin 114 according to the difference in angularity of the work piece, that is, to its change in diameter. The pin 114 is suitably connected to the plate 106 which is bolted onto the cylinder housing that slides transversely of the cross slide, which cylinder housing carries the center A that has the pin 66. This center A is, therefore, moved with respect to the relatively stationary center B on the intermediate slide block 70a and the distance between those centers is adjusted so that the tool movement will be correspondingly adjusted according to the angularity of the work piece and the difference in its diameter as the tool progresses along the work piece. As the tool moves along the work piece from its base to its apex, that is, in the direction of its decreasing diameter, this compensatory movement will shorten the distance between the centers A and B.

The next compensatory setting is to adjust this tool movement according to the number of sides that are being cut upon the work piece, and for that purpose the center of the pin 114 is adjusted as to its distance from the center of the shaft 119 by the micrometer screw 111, as indicated in Figure 45.

The hand adjustment of the cross slide 82 is provided through the screw 83 actuated by the handle 83a. On the screw shaft 83 is the pinion 83b meshing with the gear 83c.

The gear 83c is driven from the feed rod 146 through the intermediate gears 147, 150, 152, 153 and 156.

Figure 38:
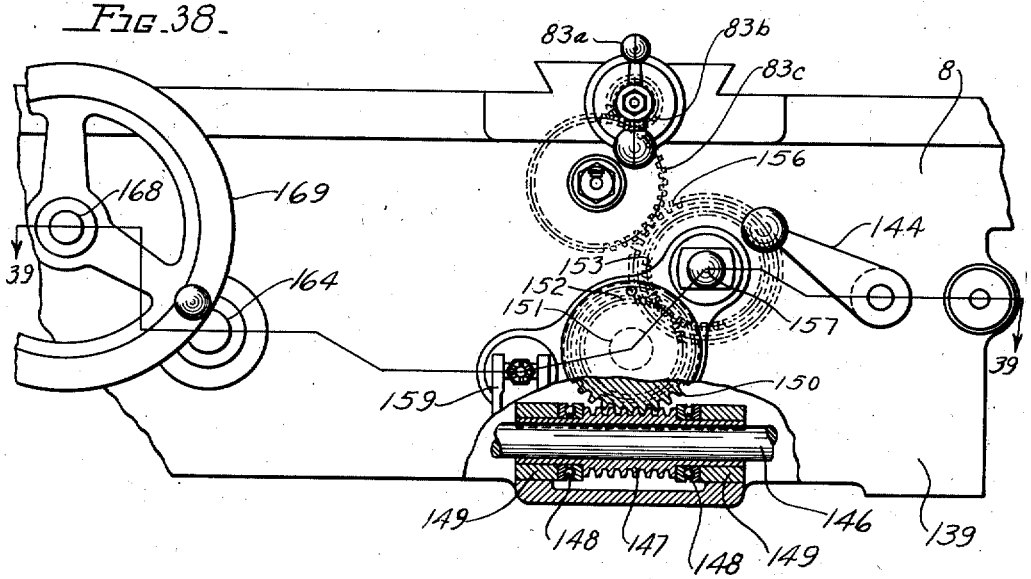
Figure 38 is a detail front elevation of the apron of the carriage partially broken away to show the feeding mechanism.
Figure 39:
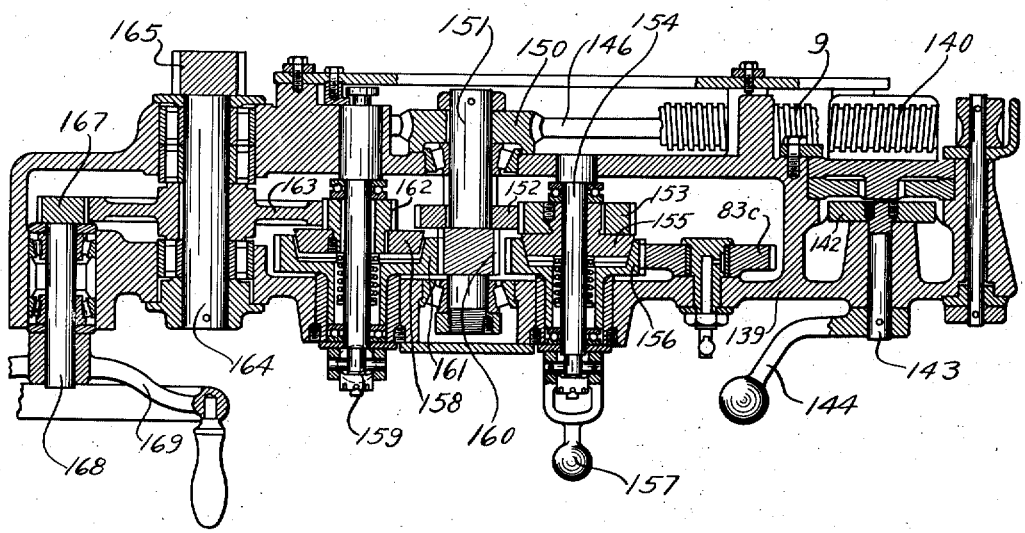
Figure 39 is a section on the line 39—39 of Figure 38.

The carriage 8 has an apron 139 which is provided with an internally-threaded block comprising a movable half 140 and a movable half 141 which are actuated by the cam 142 on the shaft 143 that, in turn, is actuated by the clamping handle 144. Through the agency of the halves 140 and 141 the apron and carriage are connected to the lead screw 9 which may be either driven automatically in connection with the former mechanism which is electrically controlled through the template and former pin, which mechanism is located at the right hand of the machine as viewed in Figure 1, or the lead screw may be operated from the motor on the left hand of the machine which operates the gearing in the gear box 145. Before more particularly describing this driving mechanism, by referring to Figures 38 and 39 the details of the carriage will be seen. The feed rod 146 carries a worm 147 between the thrust bearings 148 carried in the collars 149 in the lower portion of the apron 139. This worm 147 engages the worm wheel 150 mounted on the shaft 151 which carries the pinion 152 and meshes with the gear 153 on the shaft 154 that carries the clutch 155 and gear 156 which, in turn, meshes with the gear 83c and thence through the gear 83b, screw shaft 83 actuating the cross slide of the carriage. This takes place when the clutch lever 157 closes the clutch 155. When this clutch is opened and clutch 158 is closed by lever 159, then the shaft 151 through gear 160, gear 161, pinion 162, gear 163 and shaft 164 operate in conjunction with the pinion 165 which engages the rack 166. Hand operation of the mechanism is effected by the pinion 167 on the shaft 168 being operated by the hand wheel 169 as the pinion 167 meshes with the gear 163.

Mechanical operation of feed rod

The mechanical operation of the feed rod through the gear box 145 is in the usual manner. I do not claim in this application anything per se about this arrangement, but merely illustrate it and explain it for the purpose of clarity in the event it is desired to use this mechanical drive rather than the electrical drive hereinafter described.

145a indicates the change speed gear lever, 146a another gear shifting lever and 146e a third shift lever. 146a is a selector shift lever for the gear 146b which either meshes with the gear 146c on the lead screw, 9 or is in neutral position or meshes with the gear 146d on the feed rod 146.

With reference to Figures 26 and 27, the spindle 7 is driven from the main driving pulley 7a which is controlled by the clutch 7b operated by the clutch lever 11. This, in turn, drives the shaft 11a through suitable gearing engaging with the shaft 14a and thence through suitable gearing to the shaft 13a and thence through suitable gearing to the spindle 7.

The shifting of these gears is effected, as will be seen in Figures 17, 23 and 24 by the levers 11, 12, 13, 14 and 15. Lever 11 is the lever employed to stop the drive by opening the main clutch 7b. The lever 12 controls the spindle clutch 12a. The lever 13 operates the second intermediate clutch 13b, the lever 14 operates the second intermediate clutch 14b and the lever 15 operates the first intermediate clutch 15a. The exact details of the gearing and clutches herein form no part of this invention, but are briefly described in order to make a general presentation of the subject matter of this application.

Electrical control

Referring to Figures 19 and 37, when the work piece is to have imparted to it by a tool a configuration corresponding to the template 100 through the follower pin 90 following the margin 101 of the work piece, as has already been described in connection with Figure 19, the movement of the follower pin either places the switch arm 93 in a neutral position or closes the contacts 95 and 96 or closes the contacts 97 and 98. This arrangement is more fully set forth in my copending application Serial No. 583,570, filed Dec. 28, 1931.

Assuming that the major movement is to be longitudinal by the tool with respect to the work piece, the motor 170 driving the shaft 171 carrying the gears 172 and 173 drives the shaft 174 and either the gear 175 or the gear 176. This actuates the gears 177 and 178.

"The gear 177 may mesh with the gear 179 or the gear 178 may mesh with the gear 180. Both of these gears 179 and 180 are on the shaft 181 which carries the pinion 182 that meshes with the gear 183 carried on one half of the clutch 184. The other half of the clutch is connected at 185. The shaft 181 also carries the pinion 186 meshing with the pinion 187 and the shaft 188. The shaft 188 carries the pinion 189 engaging with the gear 190 and carrying half of the clutch 191, the other half of which is indicated at 192. The shaft 193 carries both the clutches and associated gears 183 and 190. On the shaft 193 is an intermediate pinion 194 engaging with the gear 195 on the shaft 196. The shaft 196 carries the pinion 197 which actuates a train of gears 197a, 197b, 198, 199, 200 and 201, the latter gear being mounted on the lead screw 9.

A similar arrangement is provided in connection with motor 170a which drives through the pinion 197c gear 198a on the feed rod 146. The function of the follower pin 90 is shown in a simplified diagram in Figure 19 as in its neutral position.

Referring to Figure 19, which is a simplified diagram of the basic principles involved in the electrical control, 202 indicates a dynamotor installation which converts 115 volts into 14 volts for supply to the lines 203 and 204 which lines are grounded at 205. The line 203 in conjunction with the line 206 serves to energize and actuate the relay 207 while the wire 204 in conjunction with the wire 208 energizing the relay 209. The selection of the particular circuit for energization depends upon the movement of the follower pin 90 closing the contacts as heretofore described.

When either the relay 207 or 209 is energized a switch lever 210 is moved to either contact 211 or contact 212 which results in energizing the respective clutches which are shown in detail in Figure 36 at 184, 185, 191 and 192. These clutches are connected by wires 213 and 214 to the remainder of the circuit as hereinafter described.

Thus, by the movement of the follower pin, the particular magnetic clutch desired can be selected and energized and, when energized, will determine the direction of movement of the drive to which the clutch is attached. This basic diagram applies to either the longitudinal lead screw feed or the feed rod transverse feed and applies either to forward or backward movement depending upon which clutch is energized.

Referring to the electrical system, which will be seen in diagram in Figure 37, all of the apparatus on the right hand of the center line is mounted upon the machine and all the electrical wiring and apparatus on the left hand of the center line is mounted within the cabinet illustrated in Figure 32.

At 215 is the main switch which supplies 115 voltage to the system. The heavy lines in the circuit indicate the 115 volts and the light lines in the circuit indicate the conversion of the 115 volts through the dynamotor 202 into 14 volts. 170a indicates the transverse motor and 170 indicates the longitudinal motor; as heretofore explained, the motor 170 drives either through the clutch 184—185 or clutch 191—192 as determined by the position of the follower pin 90. If the movement is to be generally to the left, the switch arm 93 would be in the neutral position indicated in Figure 19 and remain in that position until the follower pin is moved so as to close the contacts 95 and 96 which would serve to energize the magnetic clutch 191a—192a to feed the tool out through the transverse motor 170a. Upon reaching the limit of the outward movement, if the follower pin 90 should close the contacts 97 and 98 then the magnetic clutch 184a—185a would be energized and the transverse motor 170a would feed the tool in. In such an event, upon the accomplishment of the complete movement of the tool, by reversing the directional button 216 the carriage will then feed to the right due to the fact that the clutch 191—192 is energized and the operation will be repeated in the reverse direction, the motor 107a operating in and out movement of the tool, as already indicated.

It will be understood that the same relays 207 and 209 can be used for both pairs of clutches.

The exact details of this system, which are not being claimed in detail in this application, are set forth in my copending application, Serial No. 590,666, filed February 3, 1932.

It is only the general principles of application and movement that are of importance in the present application.

217 indicates the transverse and longitudinal drum switch which is used to convert the system either generally to longitudinal movement to the right hand or generally longitudinal movement to the left hand or generally "in" movement or generally "out" movement depending upon which movement will predominate. 218 marks the control panel.

It will be understood that in the specification and claims where I refer to the longitudinal tool movement and the number of faces imparted to the work piece, I comprehend not only forming the exterior of the work piece by longitudinal movement but also facing and boring movements that are likewise accomplished, there being merely a difference in terminology without a difference in substance of tool movement and sequence of operation.

*General operation*

The cutting tool is first adjusted by hand until the work piece is cut on all sides to the preferred dimension as to the number of sides and the contour of the sides. The usual hand adjustments as indicated are employed.

Then, the clutch lever 159 is actuated to close the clutch 158 thereby closing the longitudinal feed on the apron and the tool as thus set will automatically continue to cut the work piece longitudinally with the number of sides and contour of sides as desired. If, however, it is desired to use the electrical control for imparting a predetermined form to the work piece, according to the template 100 or any similar template, then 159 is opened and 157 and 144 are closed. When the electrical former control is thus used the carriage is moved longitudinally by the feed screw operated by one of the motors so controlled and the cross slide is moved transversely with the tool by the feed rod driven by the other motor, its in and out movement being controlled as heretofore described.

In the operation of the tool slide on its intermediate slide, the movement of this cutting tool into the work and out again to form a given number of in and out cycles per revolution of the work piece and this tool movement are driven from a common source of power, the tool being actuated from the head stock spindle as heretofore described.

Referring particularly to Figure 41, it will be noted that the crank at the left hand side of the figure, which is 52 in the mechanism described, makes one revolution in order to move the tool into the work and out of the work. The inward stroke is divided into 12 parts and the outward stroke is divided into 12 parts. Likewise, the upper oscillating arm movement is divided into 12 parts for its movement in one direction and 12 parts for its movement in the other direction.

The distance between the lines indicates the speed of movement. The closer the lines together the slower the speed of movement of the parts, and the further apart the lines the faster the speed of the parts. Thus, the initial movement of the oscillating arm is slow, gradually increasing in speed until it achieves a maximum nearer the end of its stroke for the inward movement of the tool and then decreases in speed until the tool comes to rest and returns reversing the operation. A similar arrangement is provided for the lower oscillating arm which is directly connected to the means for reciprocating the cutting tool.

As indicated in Figure 41, $d$ indicates the inside diameter of the work piece which may be either round initially as indicated by the diameter D or square as indicated by the diameter $d$. Assuming that the tool will start at the point designated E after having once been set to that point by hand adjustment which imparts the initial configuration desired by one rotation of the work piece. Then the tool will be pushed into the work and withdrawn from the work, as described, at the relative speed described and as indicated by the closeness of the lines that are arranged in parallelism through the left hand side of the tool. The spaces thus indicated, such as the first seven reading from the top downwardly, indicate the tool movement outwardly while forming the flat while the remaining spaces indicate the tool movement while forming the curve up to the line $f$. Thereafter, the tool is reversed forming the remaining half of the curved corner and thereafter forming the remaining half of the flat surface. In other words, I vary the speed of the stroke in order to secure a flat side with a curved corner. The speed is a function of the contour of the side, the slower the speed the more nearly will the tool approach forming a concave side because the tool, due to the slower speed, will give a tapering cut to the work piece.

I have found that, in order to secure a substantially flat side by moving the tool slowly into the work, speeding up the tool to the maximum and then decreasing the speed at the end of the stroke, I am enabled to form to 90 degrees an initial flat surface, then a curved corner and then a flat surface. The length of throw permitted by the adjustment between the centers A and B determines the depth of cut and, therefore, whether the side being cut is flat, convex or concave, the exact detail curvature being modified by the speed of tool movement through its cycle, that is, the relative speed during one portion of the cycle to the speed of the tool through another portion of the cycle, this adjustment is effected through the micrometer head 75.

If I place the center B under the center A, I have no tool movement and the tool will merely cut a circular path on the work piece. If, however, I adjust the micrometer head 75 so as to separate the centers A and B I will impart either a flat, convex or concave surface on the work piece, depending upon the distance the centers are separated. To place a convex face on the side of the work piece, the centers A and B are brought close together. I can still further modify that convexity by the relative speed at different points in the stroke in the tool, as heretofore described.

By bringing the centers A and B closer together from the position shown in Figure 41, I have less movement of the tool, that is, its length of stroke is shorter and, therefore, will place a convex surface on the work piece side, whereas, if I separate still further the centers A and B beyond the position shown in Figure 41 I will then tend to impart a concave surface to the side of the work piece because the tool will have a greater depth of stroke.

In order to automatically accommodate the extent of movement of the tool to adjust the tool to differences in diameter of the work piece as, for instance, when the work piece is to be formed in a cone, the cam 131 and its cam follower 130 operate as follows:

(a) The cam 131 is mounted upon the carriage while the cam follower with its associated mechanism is mounted upon the cross slide. Therefore, as the cross slide moves inwardly on the carriage, the adjustment of the mechanism associated with the cam follower will be adjusted according to the difference in diameter of the work piece.

(b) Such adjustment is effected through mounting the bracket 120 on the cross slide and pivoting about the center of that bracket the arm 117 which is mounted on the cam follower shaft 119 and is actuated by that shaft so as to adjust the center of the pin 114 according to the difference in angularity of the work piece, that is, to its change in diameter. The pin 114 is suitably connected to the plate 106 which is bolted on to the cylinder housing that slides transversely of the cross slide, which cylinder housing carries the center A that has the pin 66.

(c) This center A is, therefore, moved with respect to the relatively stationary center B on the intermediate slide and the distance between those centers is adjusted so that the tool movement will be correspondingly adjusted according to the angularity of the work piece and the difference in its diameter as the tool progresses along the work piece. As the tool moves along the work piece from its base to its apex, that is, in the direction of its decreasing diameter, this compensatory movement will shorten the distance between the centers A and B.

(d) The next compensatory setting is to adjust this tool movement according to the number of sides that are being cut upon the work piece, and for that purpose the center of the pin 114 is adjusted as to its distance from the center 119 by the micrometer screw 112, as indicated in Figure 45.

It will be understood that I desire to comprehend within my invention such modifications as may be necessary to adapt it to varying conditions and uses.

Having thus fully described my invention, what I claim as new and desire to secure by Letters Patent, is:

1. In a method of cutting a work piece, rotating the work piece, moving a tool inwardly and outwardly relative to the work piece in a cycle of movement in proportion to the number of sides to be formed on the work piece, regulating the extent of the movement inwardly and outwardly to determine the contour of the side on the work piece formed by the tool, moving the work piece and tool relative to one another, and modifying by a transverse movement the extent of inward movement of the tool according to the contour of the work piece so that the tool will impart the necessary angularity in section to the work piece and will follow the resulting taper thereof.

2. In a method of cutting a work piece, rotating the work piece, moving a tool inwardly and outwardly relative to the work piece in a cycle of movement in proportion to the number of sides to be formed on the work piece, regulating the extent of the movement inwardly and outwardly to determine the contour of the side on the work piece formed by the tool, moving the work piece and tool relative to one another, modifying by a transverse movement the extent of inward movement of the tool according to the contour of the work piece so that the tool will impart the necessary angularity in section to the work piece and will follow the resulting taper thereof, and regulating the point of application of the tool according to a predetermined contour to be imparted to the tool.

3. In combination, means to rotate a work piece, means to move a tool along the work piece, means while moving the tool along the work piece to reciprocate it on its longitudinal moving means so as to move the tool into the work a predetermined distance and again out of the work so as to form a face on the work piece, means to regulate the ratio of the number of in and out cycles of tool movement with respect to a given cycle of rotation of the work piece to determine the number of faces set upon the work piece, and means acting on the second-named means to regulate the length of stroke of the tool during a cycle of movement according to the angularity of the taper of the work piece finally to be formed.

4. In combination, means to rotate a work piece, means to move a tool along the work piece, means while moving the tool along the work piece to reciprocate it on its longitudinal moving means so as to move the tool into the work a predetermined distance and again out of the work so as to form a face on the work piece, means to regulate the ratio of the number of in and out cycles of tool movement with respect to a given cycle of rotation of the work piece to determine the number of faces set upon the work piece, means acting on the second-named means to regulate the length of stroke of the tool during a cycle of movement according to the angularity of the taper of the work piece finally to be formed, and means to cause the tool to move bodily both longitudinally and inwardly in addition to the cycle of its tool movement to form the face of the work whereby the work piece will have imparted thereto a predetermined configuration according to a predetermined template form.

5. In combination, means for rotating a work piece, means for synchronously moving a tool longitudinally of the work piece, while in engagement with the work piece, means to move the tool in a cycle of in and out movements in proportion to the rotative cycle of the work piece so as to form a given number of faces on the work piece, and means acting on the last-named means to modify the movement of the tool longitudinally of the work piece so as to so apply the tool to cause it to impart to the work piece a predetermined angularity.

6. In combination in a lathe having a head stock spindle, means to rotate the head stock spindle and a work piece carried thereby, a carriage, means to move the carriage with relation to the head stock, a cutting tool, a slide on said carriage supporting said cutting tool, means including a crank adjustably connected to the slide driven from said head stock for moving said tool into the work and out of the work in a predetermined number of cycles in proportion to a single revolution of the work piece according to the number of faces on the work piece to be cut.

7. In combination in a lathe having a head stock spindle, means to rotate the head stock spindle and a work piece carried thereby, a carriage, means to move the carriage with relation to the head stock, a cutting tool, a slide on said carriage supporting said cutting tool, means driven from said head stock for moving said tool into the work and out of the work in a predetermined number of cycles in proportion to a single revolution of the work piece according to the number of faces on the work piece to be cut, said means comprising a continuously-driven rotating means, a reciprocating means and a system of levers adjustably connected to said tool slide operated by said reciprocating means whereby the tool is moved inwardly to the work during a portion of the rotation of the work piece and then outwardly again.

8. In combination in a lathe having a head stock spindle, means to rotate the head stock spindle and a work piece carried thereby, a carriage, means to move the carriage with relation to the head stock, a cutting tool, a slide on said carriage supporting said cutting tool, means driven from said head stock for moving said tool into the work and out of the work in a predetermined number of cycles in proportion to a single revolution of the work piece according to the number of faces on the work piece to be cut, said means comprising a continuously-driven rotating means, a reciprocating means and a system of levers adjustably connected to said tool slide operated by said reciprocating means whereby the tool is moved inwardly to the work during a portion of the rotation of the work piece and then outwardly again, and means to modify the extent of movement by the lever system of the tool inwardly and outwardly to control the contour of the face of the work piece cut by the tool.

9. In combination in a lathe having a head stock spindle, means to rotate the head stock spindle and a work piece carried thereby, a carriage, means to move the carriage with relation to the head stock, a cutting tool, a slide on said carriage supporting said cutting tool, means driven from said head stock for moving said tool into the work and out of the work in a predetermined number of cycles in proportion to a single revolution of the work piece according to the number of faces on the work piece to be cut, said means comprising a continuously-driven rotating means, a reciprocating means and a system of levers connected to said tool slide operated by said reciprocating means whereby the tool is moved inwardly to the work during a portion of the rotation of the work piece and then outwardly again, means to modify the extent of movement by the lever system of the tool inwardly and outwardly to control the contour of the face of the work piece cut by the work, and means to modify the length of the tool movement in each cycle of movement progressively according to the angularity of the work piece to be cut so that the ultimate limit of movement of the cutting tool on the work piece will be determined according to the angularity of the work piece to be formed.

10. In combination in a lathe having a head stock spindle, means to rotate the head stock spindle and a work piece, a carriage, means to move the carriage with relation to the head stock, a cutting tool, a slide on said carriage supporting said cutting tool, means driven from said head stock for moving said tool into the work and out of the work in a predetermined number of cycles in proportion to a single revolution of the work piece according to the number of faces on the work piece to be cut, said means comprising a continuously-driven rotating means, a reciprocating means and a system of levers connected to said tool slide operated by said reciprocating means whereby the tool is moved inwardly to the work during a portion of the rotation of the work piece and then outwardly again, means to modify the extent of movement by the lever system of the tool inwardly and outwardly to control the contour of the face of the work piece cut by the work, means to modify the length of the tool movement in each cycle of movement progressively according to the angularity of the work piece to be cut so that the ultimate limit of movement of the cutting tool on the work piece will be determined according to the angularity of the work piece to be formed, and means to move the carriage longitudinally, means to move the tool slide and associated mechanism transversely on the carriage and means to automatically control said last mentioned means according to a predetermined contour in order to impart the same contour to the work piece.

11. In a machine tool having a head stock and tail stock adapted to carry a work piece, means to actuate the work piece, a cutting tool, a tool slide, a carriage on which said tool slide moves transversely, means to synchronously actuate said tool with respect to the work piece inwardly and outwardly in given numbers of cycles of movement per revolution of the work piece, means to move the carriage with relation to the workpiece longitudinally, means including a crank to move the tool slide and associated driving mechanism transversely on the carriage, and means to adjust the connection of the tool slide with the crank for controlling said last mentioned movements according to a predetermined contour to be imparted to the work piece whereby the work piece will have a contour imparted to it with a predetermined number of sides imparted to it.

12. In combination in a machine tool, means to rotate a work piece, a cutting tool, means to reciprocate the cutting tool into and out of the work a predetermined number of cycles per revolution of the work piece, means to move the tool transversely and longitudinally of said work piece independently of the cycle of movement of the tool into and out of the work piece, means for controlling said bodily longitudinal and transverse movements of the tool to impart a predetermined configuration to the work piece comprising a stationary template of the configuration desired and a follower pin controlled thereby for controlling said bodily longitudinal and transverse movements of the tool without disturbing the cyclic adjustment of the tool and the rotation of the work piece.

13. In combination in a machine tool, a carriage, a transversely-moving slide mounted thereon, a casing slidably mounted on said slide, reciprocating means carried in said casing, a lever system pivoted on said casing operated by said reciprocating means, a tool-carrying slide actuated by said lever system and carrying a cutting tool, said tool-carrying slide being reciprocal longitudinally of the carriage, and means to move the casing.

14. In combination in a machine tool, a carriage, a transversely-moving slide mounted thereon, a casing slidably mounted on said slide, reciprocating means carried in said casing, a lever system pivoted on said casing operated by said reciprocating means, a tool-carrying slide actuated by said lever system and carrying a cutting tool, said tool-carrying slide being reciprocal longitudinally of the carriage, and means acting on the reciprocating means and the casing to adjust the transverse position of the tool on its slide.

15. In combination in a machine tool, a cross slide, a transversely-moving slide mounted thereon, reciprocating means carried on said transverse slide, a lever system pivoted on said transverse slide operated by said reciprocating means, a tool-carrying slide actuated by said lever system and carrying a cutting tool, said tool-carrying slide being reciprocal longitudinally of the cross slide, and means for adjusting the transverse slide on the carriage transversely of the cross slide.

16. In combination in a machine tool, a cross slide, a transversely-moving slide mounted thereon, reciprocating means carried in the transverse slide, a lever system pivoted on said transverse slide operated by said reciprocating means, a tool-carrying slide actuated by said lever system and carrying a cutting tool, said tool-carrying slide being reciprocal longitudinally of the cross slide, and means for adjusting the transverse slide on the cross slide and means to adjust the extent of movement of the lever system to determine the length of movement inwardly and outwardly of the tool.

17. In combination in a machine tool, of a bed, a carriage longitudinally movable thereon, a cross slide on said carriage, a casing slidably mounted on said cross slide and carrying reciprocating means and a lever mechanism, a longitudinally-moving tool-supporting slide on the cross slide connected to said lever mechanism, means for continuously driving said reciprocating means and lever mechanism, means for adjusting the centers of said lever mechanism to modify the extent of movement of the cutting tool and its slide.

18. In combination in a machine tool, of a bed, a carriage longitudinally movable thereon, a transverse slide on said carriage carrying reciprocating means and a lever mechanism, a longitudinally-moving tool-supporting slide connected to said lever mechanism, means for continuously driving said reciprocating means and lever mechanism, means for adjusting the centers of said lever mechanism to modify the extent of movement of the cutting tool and its slide, a cam mounted upon said carriage, means associated with said cam for so moving the transverse slide carrying the reciprocating means and lever mechanism as to modify the extent of movement inwardly and outwardly of the cutting tool to cause the cutting tool to impart an angularity of form to the work piece being cut according to the cam on the carriage.

19. In combination in a machine tool, a bed, a carriage longitudinally movable thereon, a transverse slide on said carriage carrying reciprocating means and a lever mechanism, a longitudinally-moving tool-supporting slide connected to said lever mechanism, means for continuously driving said reciprocating means and lever mechanism, means for adjusting the centers of said lever mechanism to modify the extent of movement of the cutting tool and its slide, a cam mounted upon said carriage, means associated with said cam for so moving the transverse slide carrying the reciprocating means and lever mechanism as to modify the extent of movement inwardly and outwardly of the cutting tool to cause the cutting tool to impart an angularity of form to the work piece being cut according to the cam on the carriage, and means of adjusting said last mentioned means according to the number of sides being cut by the tool on the work piece.

20. In combination, a machine tool, a cross slide, a transversely movable driving means having therein a reciprocating mechanism on said slide, a longitudinally movable tool supporting means connected to said mechanism mounted on the cross slide.

21. In combination, a machine tool, a cross slide, a transversely movable driving means having therein a reciprocating mechanism on said slide, a longitudinally movable tool supporting means connected to said mechanism mounted on the cross slide, means of adjusting the extent of movement of the reciprocating mechanism.

22. In combination, a machine tool, a cross slide, a transversely movable driving means having therein a reciprocating mechanism on said slide, a longitudinally movable tool supporting means connected to said mechanism mounted on the cross slide, means for adjusting the extent of movement of the reciprocating mechanism, and means for further adjusting the extent of tool movement by modifying the transversely movable means carrying the reciprocating means.

23. In combination in a machine tool, a bed, a carriage mounted thereon, means of rotating a work piece, a tool slide moving inwardly and outwardly on the carriage, operating mechanism for the tool slide moving transversely of of the carriage and longitudinally of the machine tool, reciprocating mechanism carried thereby for moving the tool slide, means of driving said reciprocating mechanism in synchronism with the work piece, means of adjusting the extent of movement of the tool slide by the reciprocating mechanism by adjusting the extent of throw thereby, and means of further modifying the extent of said throw by bodily moving the slide carrying the reciprocating mechanism in a direction transversely of the carriage and longitudinally of the machine tool.

24. In combination in a carriage, a cross slide, a tool-carrying transverse slide on the cross slide, a slide moving transversely of the cross slide and tool slide, a lever system carried by the transverse slide connected to the tool slide for reciprocating it longitudinally of the cross slide, means of adjusting the extent of throw of the lever mechanism, means in the transverse slide to reciprocate said lever mechanism in cycles.

25. In combination in a carriage, a cross slide, a tool-carrying transverse slide, a slide moving transversely of the cross slide and tool slide, a lever system carried by the transverse slide connected to the tool slide for reciprocating it, means of adjusting the extent of throw of the lever mechanism, means to reciprocate said lever mechanism in cycles, a cam on the carriage, means connected to the slide carrying the reciprocating mechanism adapted to move said slide with respect to said carriage and thereby modify the action of the lever mechanism in moving the tool-carrying slide.

26. In combination in a carriage, a cross slide, a tool-carrying transverse slide, a slide moving transversely of the cross slide and tool slide, a lever system carried by the transverse slide connected to the tool slide for reciprocating it, means of adjusting the extent of throw of the lever mechanism, means to reciprocate said lever mechanism in cycles, a cam on the carriage, means connected to the slide carrying the reciprocating mechanism adapted to move said slide with respect to said carriage and thereby modify the action of the lever mechanism in moving the tool-carrying slide, means to move the carriage longitudinally of the machine tool, and means to move the cross slide transversely of the machine tool.

27. In a machine tool, a carriage, a cross slide thereon, a tool slide moving longitudinally of the cross slide, a reciprocating slide mechanism moving transversely of said slides, a reciprocating piston member in said slide mechanism, a pin carried by said piston member having a block on each end, arms engaging said blocks, a pivot pin carried by said arms, an arm on said pivot pin, a block mounted in said last-named arm adjustable with respect to said pivot pin and connected to said tool slide.

28. In a machine tool, a carriage, a cross slide thereon, a tool slide moving longitudinally of the cross slide, a reciprocating slide mechanism moving transversely of said slides, a reciprocating piston member in said slide mechanism, a pin carried by said piston member having a block on each end, arms engaging said blocks, a pivot pin carried by said arms and mounted in the slide mechanism, an arm on the pivot pin, a block mounted in the last-named arm adjustable with respect to said pivot pin and connected to said tool slide, a cam mounted on said carriage, a cam follower, and yielding means to cause said follower to follow said cam, means connecting said cam follower to the slide mechanism.

29. In a machine tool, a carriage, a cross slide thereon, a tool slide moving longitudinally of the cross slide, a reciprocating slide mechanism moving transversely of said slides, a reciprocating piston member in said slide mechanism, a pin carried by said piston member having a block on each end, arms engaging said blocks, a pivot pin carried by said arms and mounted in the slide mechanism, an arm on the pivot pin, a block mounted in the last-named arm adjustable with respect to said pivot pin and connected to said tool slide, a cam mounted on said carriage, a cam follower, and yielding means to cause said follower to follow said cam, means connecting said cam follower to the slide mechanism, and means for adjusting the connection between said cam follower and said slide mechanism.

30. In a machine tool, a carriage, a reciprocating driving means thereon, rotating means for driving said reciprocating means, crank means driven by the reciprocating means, a tool-carrying slide reciprocated by the crank, means for adjusting the centers between the elements of said crank, and means operated on the movement of the tool slide to control the extent of reciprocating of the tool slide without modifying the action of the remainder of the mechanism.

31. In a machine tool, the combination of a carriage, a cam thereon having an angularity corresponding to the angularity of a work piece to be cut, a cam follower, yielding means for maintaining said follower on the cam, an arm connected to said cam follower, a sliding block in the arm, means for adjusting the position of said block in the arm according to the number of sides on a work piece to be cut, and means connected to said block adapted to adjust the position of the cutting tool with respect to a work piece to regulate the angularity of the resulting work piece.

32. In combination in a machine tool, means of rotating a work piece, means to move a cutting tool longitudinally and transversely of the work piece to impart a predetermined contour thereto, means operated synchronously with the rotation of the work piece for modifying the tool position to impart a predetermined number of faces to the work piece, means to modify the last mentioned means according to the angularity of the work piece to be cut, a template, electrical means controlled thereby for controlling the bodily longitudinal and transverse movement of the cutting tool with respect to the work piece so as to impart a predetermined contour according to the template form to the work piece while at the same time forming the number of sides and the contour of sides desired on said work piece.

33. In combination, means to rotate a work piece, a tool carriage, a tool-carrying slide moving inwardly and outwardly on the carriage, means of actuating said tool slide synchronously with the rotation of the work piece, means of adjusting the ratio therebetween, means of moving the carriage longitudinally of the machine tool, means of moving the tool-carrying slide transversely of the tool without modifying its reciprocation, electrical means for imparting said longitudinal and transverse movements, and magnetic clutches controlling said electrical means, an electric switch for controlling said magnetic clutches and electric circuit associated therewith, and template control means for operating said switch.

34. In combination, means to rotate a work piece, a tool carriage, an electric motor to move the carriage longitudinally of the tool bed, a tool-carrying slide moving inwardly and outwardly on the carriage, an electric motor for moving it inwardly and outwardly, a template, a follower pin mounted on said carriage engaging said template, a switch controlled by said follower pin and means including an electric circuit and said motors controlling said motors and the movement of the carriage and slide thereby, a cutting tool on said slide, means of moving said cutting tool into and out of a work piece in synchronism with the rotation of the work piece.

35. In combination, means to rotate a work piece, a tool carriage, an electric motor to move the carriage longitudinally of the tool bed, a tool-carrying slide moving inwardly and outwardly on the carriage, an electric motor for moving it inwardly and outwardly, a template, a follower pin mounted on said carriage engaging said template, a switch controlled by said follower pin and means including an electric circuit in said motors controlling said motors and the movement of the carriage and slide thereby, a cutting tool on said slide, means of moving said cutting tool into and out of a work piece in synchronism with the rotation of the work piece, a cam means on the carriage, and means controlled thereby for varying the tool position with respect to the work piece according to the longitudinal contour of the work piece being cut.

36. In combination, in a machine tool, means to rotate a work piece, means synchronized with said rotating means adapted to convert the rotary motion thereof into reciprocatory motion, a member reciprocated thereby, a crank connected to said member, a tool reciprocated by said crank in a given number of cycles of in and out movement with respect to the work piece per revolution of the work piece, and means to move the member and the crank together.

37. In combination in a machine tool, a cross slide, a transversely-moving slide mounted thereon, reciprocating means carried therein, a lever system pivoted on said slide operated by said reciprocating means, a tool-carrying slide on the cross slide actuated by said lever system and carrying a cutting tool, said tool-carrying slide being reciprocal longitudinally of the carriage, said reciprocating means and lever system being so arranged that at the beginning of the stroke of the tool there is a relatively slow movement increasing in speed to a maximum and then decreasing in speed for its end of the stroke.

38. In combination in a carriage, a cross slide, a tool-carrying slide on the cross slide, a slide moving transversely of the cross slide and tool slide, a lever system carried thereby connected to the tool slide for reciprocating it, means of adjusting the extent of throw of the lever mechanism, means to reciprocate said lever mechanism in cycles, and means of controlling the relative speed of the reciprocating mechanism and tool during a given cycle by which the stroke starts relatively slowly increasing in speed to a maximum and then decreasing in speed.

39. In combination, in a machine tool, means to rotate a work piece, means synchronized with said rotating means adapted to convert the rotary motion thereof into reciprocatory motion, a member reciprocated thereby, a crank operated by said member, a tool reciprocated by said crank a given number of cycles of in and out movements with respect to the work piece per revolution of the work piece, said rotating means being so arranged in combination with the reciprocating means as to move the tool slowly at the beginning of the stroke increasing in speed towards the middle of the stroke and then decreasing in speed.

40. In a turning apparatus, in combination with a cross slide, an intermediate tool carrying slide mounted on the cross slide, a transverse slide mounted on the cross slide for movement transverse the movement of the intermediate slide, means in the transverse slide to reciprocate the intermediate slide, and means to move the transverse slide.

41. In a turning apparatus, means to rotate a workpiece, means to move a tool longitudinally of the workpiece, means to move the tool in a path transverse the workpiece, and means in addition to the first-named means to move the last-named means longitudinally of the workpiece.

42. In a turning apparatus, means to rotate a workpiece, means to move a tool longitudinally of the workpiece, a casing having means therein to move the tool in a path transverse the workpiece, and means to move the casing longitudinally of the workpiece to modify the action of the tool on the workpiece.

43. In a turning apparatus, means to rotate a workpiece, means to move a tool longitudinally of the workpiece, a casing having means therein to move the tool in a path transverse the workpiece, and adjustable means to move the casing longitudinally of the workpiece to modify the action of the tool on the workpiece.

44. In a turning apparatus, means to rotate a workpiece, means to move a tool longitudinally of the workpiece, a casing having means therein adjustably connected to the tool to move the tool in a path transverse the workpiece, and means to move the casing longitudinally of the workpiece to modify the action of the tool on the workpiece.

45. In a turning apparatus, means to rotate a workpiece, means to move a tool longitudinally of the workpiece, means to move the tool transverse the workpiece, a casing having means therein to move the tool to and from the workpiece during the former two movements, and means operated by the transverse movement of the tool to move the casing longitudinally of the workpiece to modify the action of the tool on the workpiece.

CLIFFORD A. BICKEL.